(12) United States Patent
Harris et al.

(10) Patent No.: US 7,391,550 B2
(45) Date of Patent: Jun. 24, 2008

(54) METHOD AND APPARATUS FOR OPTICAL BROADBAND FREQUENCY CHIRP

(75) Inventors: Todd Harris, San Francisco, CA (US); Kristian Merkel, Bozeman, MT (US)

(73) Assignee: Montana State University, Bozeman, MT (US)

( * ) Notice: Subject to any disclaimer, the term of this patent is extended or adjusted under 35 U.S.C. 154(b) by 208 days.

(21) Appl. No.: 10/554,988

(22) PCT Filed: May 6, 2004

(86) PCT No.: PCT/US2004/014019

§ 371 (c)(1),
(2), (4) Date: Oct. 28, 2005

(87) PCT Pub. No.: WO2004/102812

PCT Pub. Date: Nov. 25, 2004

(65) Prior Publication Data

US 2006/0203324 A1  Sep. 14, 2006

Related U.S. Application Data

(60) Provisional application No. 60/538,422, filed on Jan. 22, 2004, provisional application No. 60/468,557, filed on May 7, 2003.

(51) Int. Cl.
*G02F 1/23* (2006.01)

(52) U.S. Cl. .......... 359/278; 359/264; 359/287; 398/187; 398/199

(58) Field of Classification Search .......... 359/278, 359/264, 285, 287, 238, 305, 312; 398/187, 398/199; 342/200, 202; 385/8
See application file for complete search history.

(56) References Cited

U.S. PATENT DOCUMENTS 3,932,818 A * 1/1976 Masak .......... 708/322

* cited by examiner

*Primary Examiner*—Hung X. Dang
*Assistant Examiner*—Joseph Martinez
(74) *Attorney, Agent, or Firm*—Evans & Molinelli PLLC; Eugene Molinelli

(57) ABSTRACT

Techniques for producing an optical broadband frequency sweep or chirp, include generating a narrowband frequency chirp and a frequency-shifted replica. The narrowband chirp has an optical carrier frequency, a pulse duration and a pulse bandwidth. A frequency-shifted replica is generated by frequency shifting the narrowband chirp by a frequency shift. Adding the frequency-shifted replica after a start of the narrowband chirp by a delay generates a broadband frequency chirp. Alternatively, the frequency-shifted replica is generated by frequency shifting a constant frequency pulse, and modulating the frequency-shifted pulse to generate narrowband chirps that are added to form the broadband chirp.

36 Claims, 14 Drawing Sheets

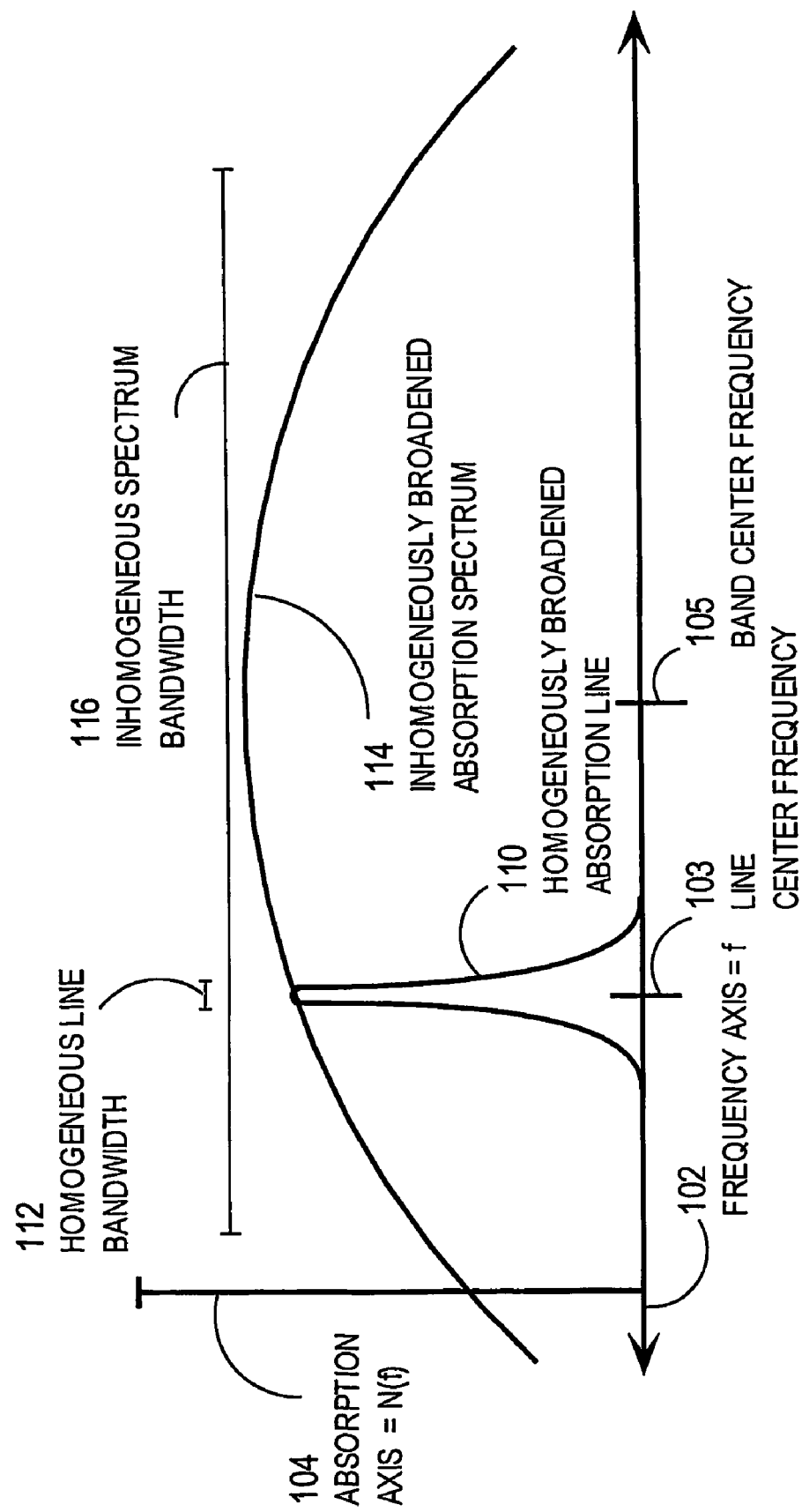

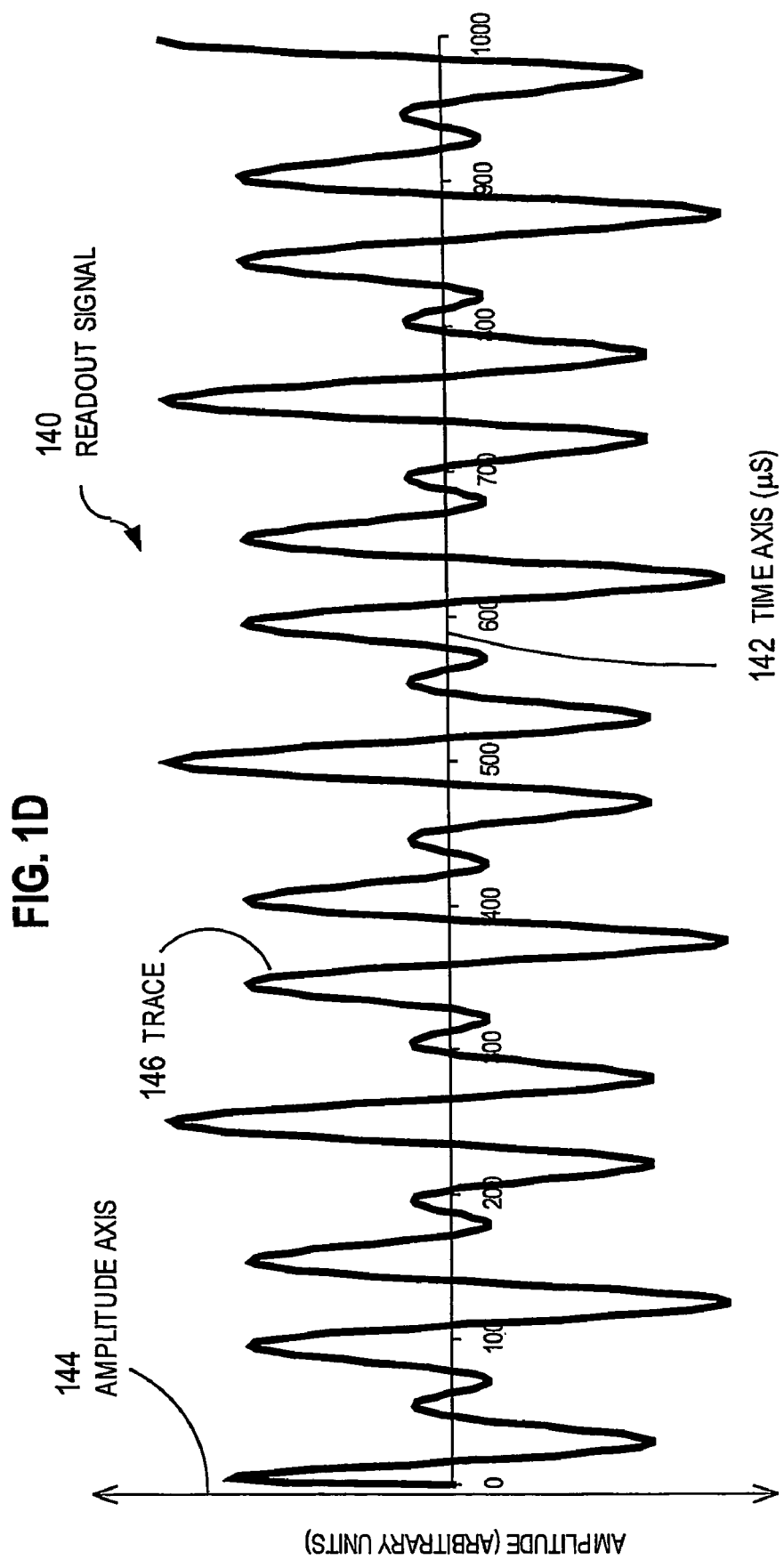

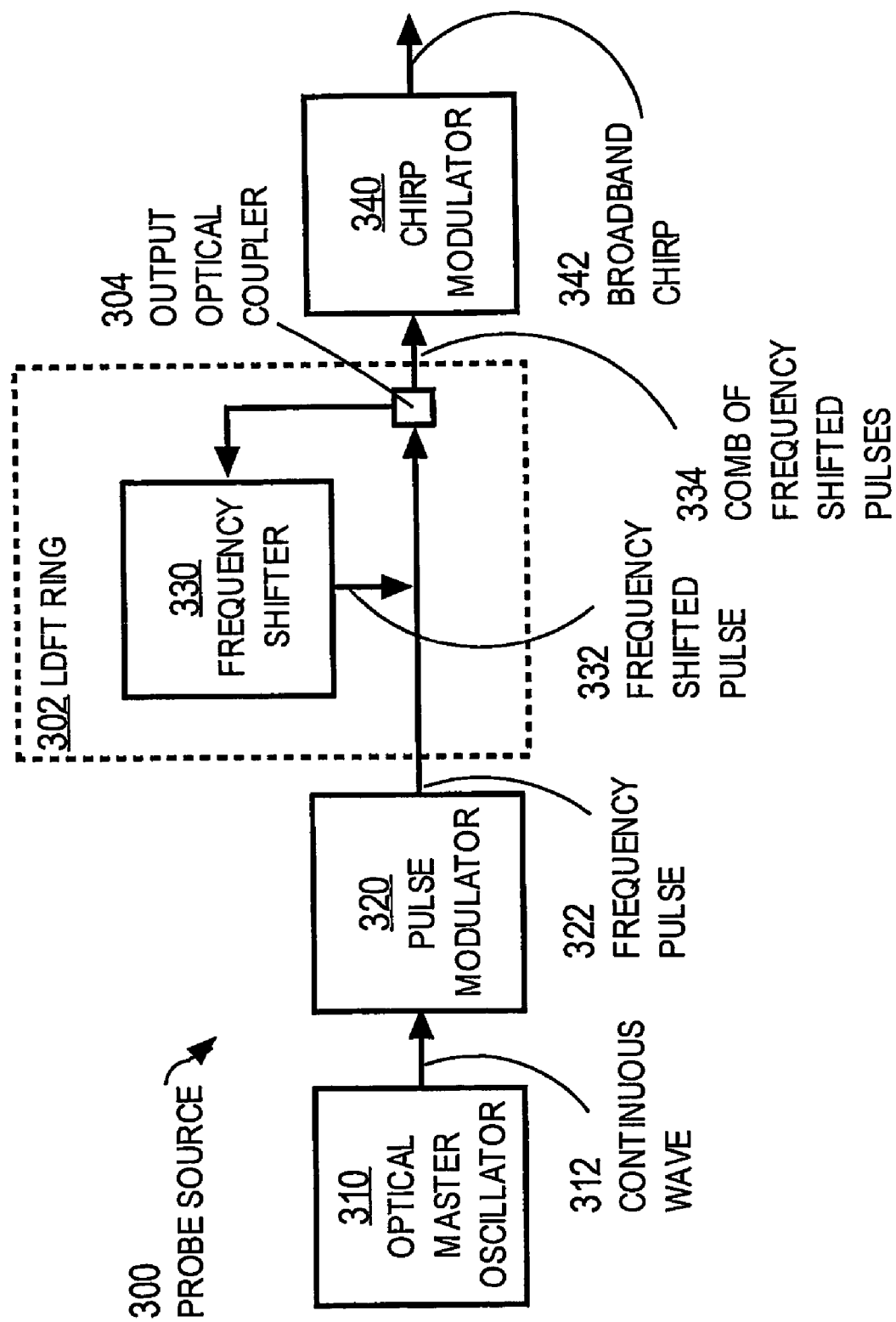

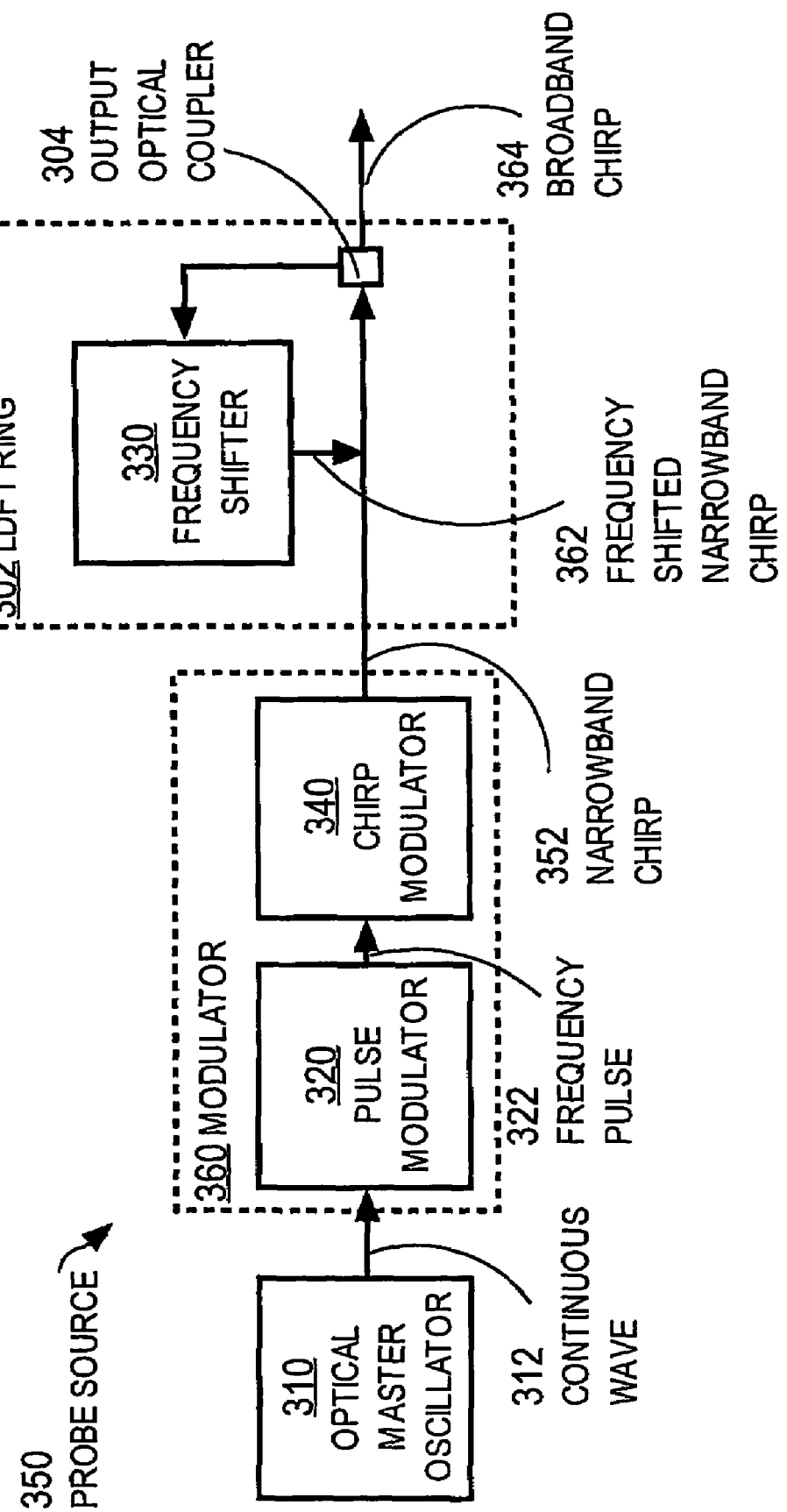

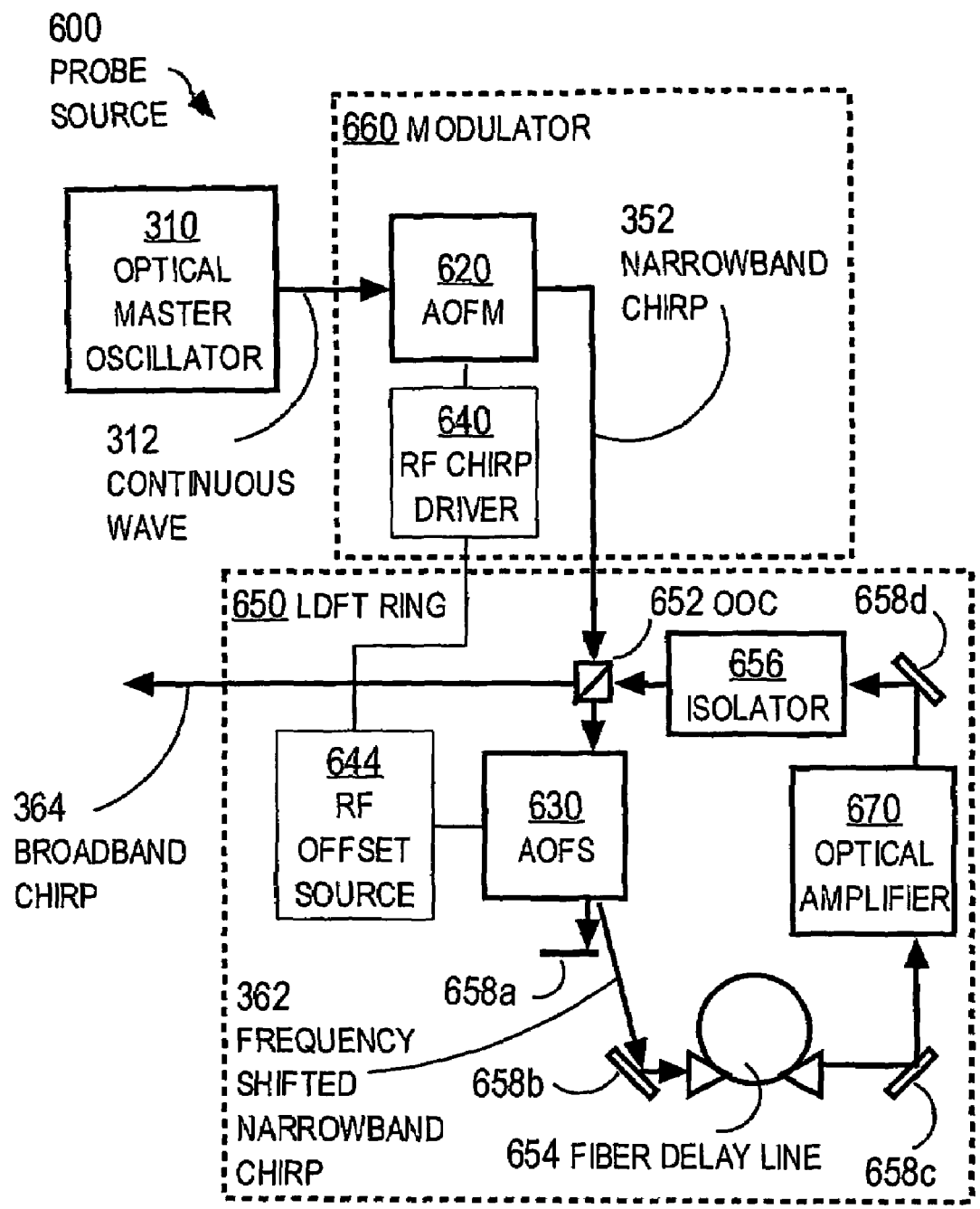

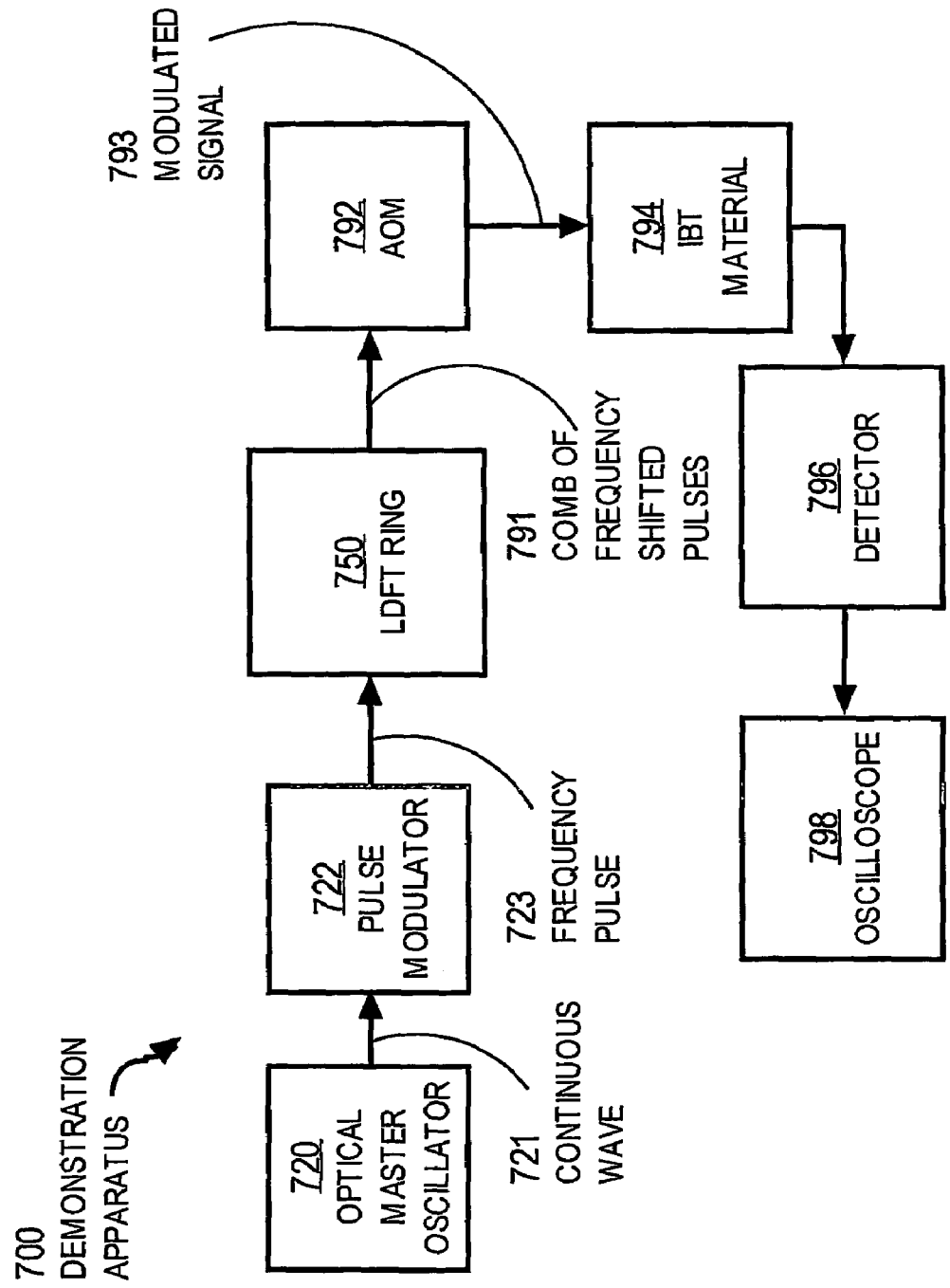

METHOD AND APPARATUS FOR OPTICAL BROADBAND FREQUENCY CHIRP

CROSS-REFERENCE TO RELATED APPLICATIONS

This application claims benefit of U.S. Provisional Application 60/468,557, by Todd L. Harris and Kristian Doyle Merkel, entitled "Lightwave Broadband Continuous Frequency Sweeper Apparatus," filed May 7, 2003, the entire contents of which are hereby incorporated by reference as if fully set forth herein, under 35 U.S.C. §119(e).

This application is related to Patent Cooperation Treaty Application PCT/US03/14612, by Kristian Doyle Merkel, Zachary Cole, Krishna Mohan Rupavatharam, William Randall Babbitt and Kelvin H. Wagner, entitled "Techniques for Processing High Time-Bandwidth Signals Using a Material with Inhomogeneously Broadened Absorption," filed May 12, 2003 (hereinafter Merkel I), the entire contents of which are hereby incorporated by reference as if fully set forth herein.

This application also claims benefit of U.S. Provisional Application 60/538,422, by Kristian Doyle Merkel and William Randall Babbitt entitled "Techniques for Multiple Frequency Chirp Readout of Material with Inhomogeneously Broadened Absorption Spectrum," filed Jan. 22, 2004 (hereinafter Merkel II), the entire contents of which are hereby incorporated by reference as if fully set forth herein, under 35 U.S.C. §119(e).

BACKGROUND OF THE INVENTION

1. Field of the Invention

The present invention relates to a method and apparatus to enable wide bandwidth coverage of an optical spectral region with a temporal sequence of several narrowband optical frequency chirped pulses that are each frequency shifted.

2. Description of the Related Art

Optical linear frequency modulation (LFM) signals, i.e., frequency sweeps or "chirped" signals (also called "chirps") have many uses in optical devices and processors. For example, chirps can be used to generate optical signals, to interact with optical signals, and to probe the optical spectral contents of devices or materials.

In a recent approach described in Merkel I, a temporally extended chirp is used as a probe waveform to generate a readout signal that represents a temporal map of the structure of the spectral population grating in an inhomogeneously broadened (IBT) material, rather than its Fourier transform. This temporal map signal can be measured with inexpensive, high-dynamic-range, MHz bandwidth detectors and digitizers. Such chirps generally have a duration greater than the decoherence time and less than the population decay time of the inhomogeneously broadened absorption spectrum in IBT material. As described in Merkel I, a chirp sweeping over some wideband portion of the IBT frequency absorption profile of interest e.g., typically in excess of 1 GHz can produce a low-bandwidth readout signal that can be detected and digitized with the low-bandwidth high-dynamic-range devices currently available. This low-bandwidth readout signal represents a temporal map of the spectral features in the spatial-spectral grating. For example, in some cases the readout signal includes a temporal spike that represents a single frequency hole burned in the IBT material, and in other cases the readout signal includes a superposition of low-bandwidth beat frequencies, each beat related to a periodic component in the frequency spectrum of the grating.

However, current known techniques for producing spectrally pure, phase continuous radio frequency chirps that are linear in frequency and very stable are limited to pulses with bandwidths less than about 400 MHz. For example, direct digital synthesis (DDS) of radio frequency signals with a digital to analog converter (DAC) produces a given sample rate and with given bits in the resolution for each sample. For example, with currently available state of the art DDS techniques, using a high clock rate and high-dynamic-range digital to analog converters (e.g., AD9858, 10 bit DDS at 1000 Ms/s, available from Analog Devices of Norwood, Mass., 1 Ms=a Mega sample=$10^6$ samples; a bit denotes the number of base 2 levels in a quantized system, i.e., 10 bits=$2^{10}$ quantized levels), a linear, repeatable, stable and phase continuous RF chirped pulse can be created with a bandwidth covering less than about 500 MHz (e.g., 0 to 400 MHz). The RF chirp can be impressed on an optical signal using an optical modulator such as an electro-optical modulator (EOM) or an acousto-optic modulator (AOM).

EOMs modify the optical carrier with double sidebands one above and one below the carrier frequency. AOMs shift the frequency of the optical beams and deflect optical beams by an angle proportional to the frequency shift. Optical beams can be double passed through an AOM to double the bandwidth of the RF signal, and remove angular deflections in the modulated beam. AOMs can be made single sideband easily because the carrier and second sideband beam are in different directions than the modulated beam with the first sideband.

Optical rings with a frequency shifter are known to produce a wide range of optical frequencies from a given optical frequency. See for example, K. Shimnizu, T. Horiguchi, Y. Hoyamada, "Technique for translating light-wave frequency by using an optical ring circuit containing a frequency shifter," *Optics Letters*, vol. 17, p1307, 1992; Takesue et al., "Stable Lightwave Frequency Synthesis Over 1-THz Span Using Fabry-Perot Cavity Containing Polarization-Rotation Elements and Actively Controlled Tunable Bandpass Filter," *IEEE Photonics Technology Letters*, vol. 12, p79, 2000; the entire contents of each of which are hereby incorporated by reference as if fully set forth herein. Similar rings have been used to produce a sweep of discrete frequencies. See for example, M. Ishikawa, H. Yasaka, F. Kano, Y. Yoshikuni, "Optical frequency sweeper using an optical ring circuit with a tunable injection-locking filter," *IEEE Photonics Technology Letters*, vol. 11, n12, p1668, 1999; and U.S. Pat. No. 5,786,930 by Takatsu et al., issued Jul. 28, 1998; the entire contents of each of which are hereby incorporated by reference as if fully set forth herein.

While some of these references claim to generate optical frequency sweeps, in every case the frequency shift ($\Delta f$) imparted to an input signal at each pass through the loop is much greater than the bandwidth of the input signal, which is a single optical frequency (an optical "tone"). Thus the optical "sweeps" generated in the references are not continuous in frequency, even for short frequency ranges, but are noticeably stepped, i.e., they produce a series of discrete frequencies. The frequency gaps they leave make them unsuitable for reading out most spectra programmed into an IBT material, or other applications of interest wherein quasi-continuous coverage of broad bandwidths with optical frequency chirps are desired. As used herein the terms quasi-continuous frequency sweeps (or quasi-continuous chirps) are used to indicate chirps that are continuous in frequency for a least short frequency ranges, to distinguish such sweeps or chirps from the discrete frequency sweeps of prior art approaches.

Based on the foregoing, there is a clear need for techniques to produce a wideband frequency chirp that does not suffer the disadvantages of prior art approaches. In particular, techniques are needed to generate a stable, linear frequency chirped pulse over frequency ranges of much greater than 1 GHz, with RF sources that have bandwidths that are presently less than 1 GHz. Additionally, or in the alternative, there is a particular need for a linear, stable wideband frequency chirp with a wide bandwidth and an appropriate chirp rate to create a temporal map of the entire frequency band of interest in an IBT material.

The past approaches described in this section could be pursued, but are not necessarily approaches that have been previously conceived or pursued. Therefore, unless otherwise indicated herein, the approaches described in this section are not to be considered prior art to the claims in this application merely due to the presence of these approaches in this background section.

SUMMARY OF THE INVENTION

Techniques are provided for generating an optical broadband frequency sweep or chirped signal. Such a signal can be used, among other applications, as the probe waveform for either programming or reading out the spectral content of a spatial-spectral grating in an IBT material. In frequency chirped readout applications, these techniques allow wide-bandwidth spectral content to be read with low-bandwidth high-dynamic-range detectors and digitizers that are less expensive, more sensitive and more readily available than high-bandwidth devices.

According to one set of embodiments of the invention, a method for producing an optical broadband continuous frequency sweep includes generating a narrowband frequency chirp having an optical carrier frequency, a duration and a pulse bandwidth. A frequency-shifted replica is generated by frequency shifting the narrowband frequency chirp by a frequency shift. Appending the frequency-shifted replica at a time delay after the narrowband frequency chirp generates a broadband frequency chirp.

In an embodiment of this set, the frequency shift is substantively equal to the pulse bandwidth. In another embodiment, the frequency shift is less than the pulse bandwidth.

According to some embodiments of this set, the step of generating the frequency-shifted replica is repeated by frequency shifting a previously frequency-shifted replica by the same frequency shift. Appending the new frequency-shifted replica to a previous broadband frequency chirp generates an extended broadband frequency chirp.

In another set of embodiments, a method of producing the optical broadband continuous frequency sweep includes generating a first optical chirp having a pulse bandwidth by modulating with a radio frequency chirp an optical frequency pulse having a carrier frequency and a pulse duration. Frequency shifting the optical frequency pulse by a particular frequency shift generates a frequency-shifted replica. Modulating the frequency-shifted replica with the radio frequency chirp generates a second optical chirp having the pulse bandwidth. Appending the second optical chirp after the first optical chirp generates a broadband frequency chirp.

In an embodiment of this set, the frequency shift is substantively equal to the pulse bandwidth. In another embodiment, the frequency shift is less than the pulse bandwidth.

According to some embodiments of this set, the method includes repeating the step of generating the frequency-shifted replica by frequency shifting a previously frequency-shifted replica by the frequency shift. In these embodiments, the method also includes repeating the step of modulating the frequency-shifted replica with the radio frequency chirp to generate a new second optical chirp. Appending the new second optical chirp to a previous broadband frequency chirp generates an extended broadband frequency chirp.

In other sets of embodiments, an apparatus implements one or more of the above methods. In one set, the apparatus for producing an optical broadband frequency sweep includes an optical source for generating a frequency-stabilized, optical frequency signal and a radio frequency source for generating a radio frequency chirp. A chirp modulator in optical communication with the optical source and in electronic communication with the radio frequency source forms an optical narrowband chirp having a pulse bandwidth and a pulse duration based on the optical frequency signal and the radio frequency chirp. A frequency shifter in optical communication with the chirp modulator forms a frequency-shifted replica by shifting an input optical signal by a frequency shift. An optical coupler causes the frequency-shifted replica to be added after a start of the input optical signal by a delay.

In an embodiment of this set, a separate pulse modulator in optical communication with the optical source forms a pulse of the pulse duration based on the optical frequency signal.

In some embodiments of this set, the apparatus includes an optical ring, and the frequency shifter and the optical coupler are included in the optical ring. In some of these embodiments, the optical ring includes a delay line for timing the frequency-shifted replica after the start of the input optical signal and includes one or more other optical components. The other optical components correct deviations in one or more optical properties of the frequency-shifted replica caused by propagation of the replica through the optical ring, such as amplitude, polarization, phase and direction of propagation of the replica.

According to another set of embodiments, the apparatus for producing an optical broadband frequency sweep includes an optical source for generating a frequency-stabilized, optical frequency signal and a radio frequency source for generating a radio frequency chirp. A frequency shifter in optical communication with the optical source forms a frequency-shifted replica by shifting an input signal by a particular frequency shift. A chirp modulator in optical communication with the frequency shifter and in electronic communication with the radio frequency source forms an optical narrowband chirp based on a reference optical signal and the radio frequency chirp. The narrowband chirp has a pulse duration and a pulse bandwidth. An optical coupler in optical communication with the chirp optical modulator combines a narrowband chirp based on the input signal as the reference optical signal before a narrowband chirp based the frequency-shifted replica as the reference optical signal.

In an embodiment of this set, a separate pulse modulator in optical communication with the optical source forms a pulse of the pulse duration based on the optical frequency signal.

In some embodiments of this set, the apparatus includes an optical ring, and the frequency shifter and the optical coupler are included in the optical ring. In some of these embodiments, the optical ring includes a delay line for timing the frequency-shifted replica after the reference optical signal and includes one or more other optical components. The other optical components correct deviations in one or more optical properties of the frequency-shifted replica caused by propagation of the replica through the optical ring, such as amplitude, polarization, phase and direction of propagation of the replica.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a graph that illustrates a homogeneously broadened absorption spectral line and an inhomogeneously broadened absorption spectrum in an IBT material;

FIG. 1D is a graph that illustrates an example readout signal based on the spectral content of FIG. 1B and the probe waveform of FIG. 1C;

FIG. 3A is a block diagram that illustrates an apparatus for producing optical broadband quasi-continuous frequency sweep, according to an embodiment;

FIG. 3B is a block diagram that illustrates an apparatus for producing optical broadband quasi-continuous frequency sweep, according to another embodiment;

FIG. 6A is a block diagram that illustrates an apparatus for producing a broadband quasi-continuous frequency chirp, according to a more detailed embodiment;

FIG. 7A is a block diagram that illustrates an apparatus for demonstrating the operation of a source for a broadband chirp, according to an embodiment.

DETAILED DESCRIPTION

Figure 1B:
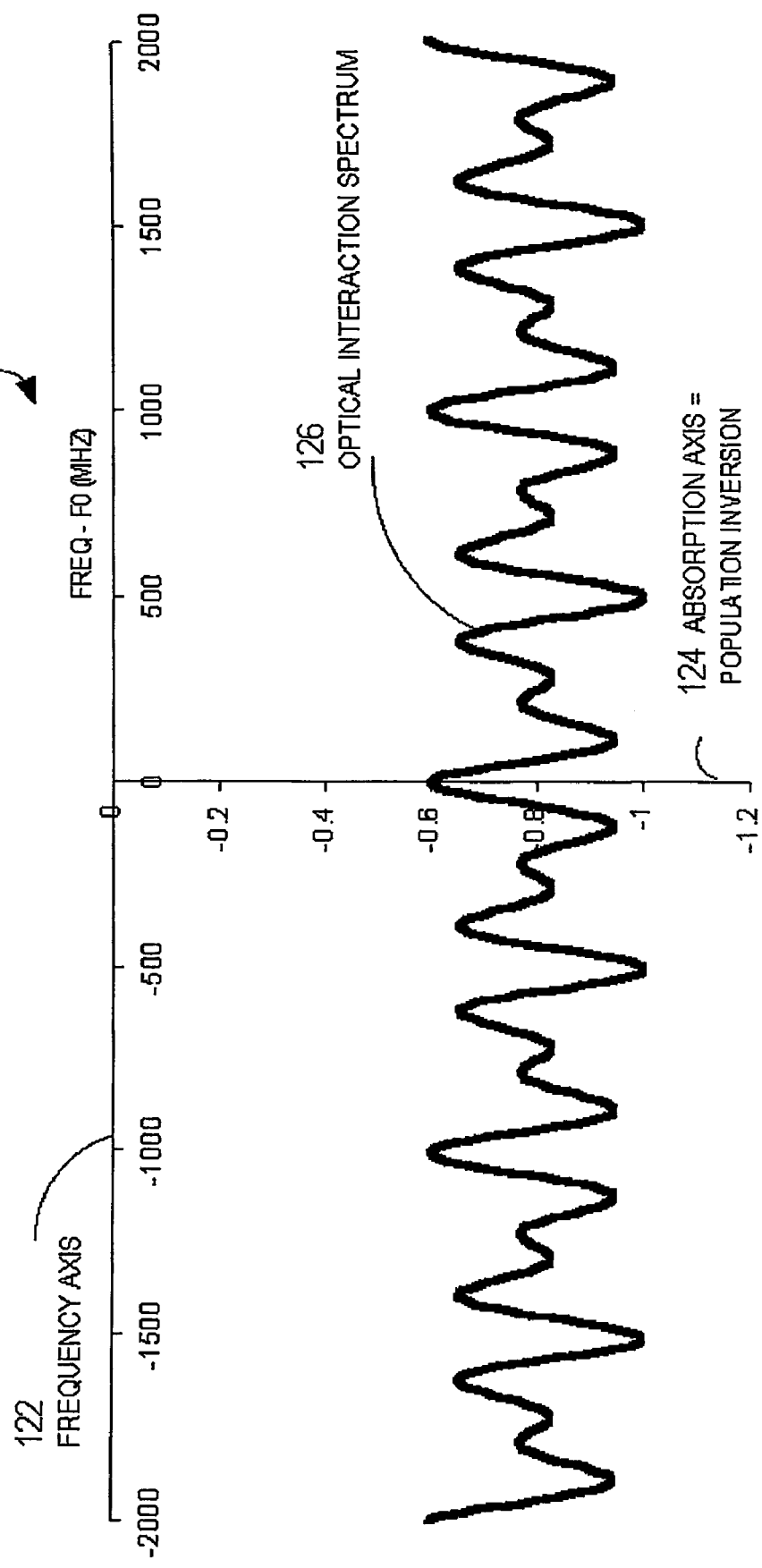
FIG. 1B is a graph that illustrates spectral content of an example spatial-spectral grating in an IBT material, according to an embodiment.

A method and apparatus are described for generating a wideband frequency chirped pulse, or frequency sweep. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In the following description, embodiments of the invention are described in the context of probing the spectral content of an IBT material. However, the invention is not limited to this context. In other contexts, embodiments of the invention are applied to generating optical signals, programming IBT materials, programming or probing other materials, and processing optical signals, among other applications. For example, a broadband chirp may be superimposed with a second optical source of unknown spectral content at a photodetector. The resulting photodetector signal contains the spectrum of the second optical source as a temporal map. If the spectrum of the second source did not change during the time scale of the chirp and if the chirp is well characterized, e.g., substantively continuous ("quasi-continuous"), then the spectrum of the second source can be de-convolved from the photodetector signal.

Embodiments of the present invention are described according to the following outline.
    1.0 Functional Overview
    2.0 Example Application: Broadband Chirp Readout
        2.1 Probe and Readout Signals
        2.2 Readout Structural Overview
    3.0 Source for Broadband Optical Chirp
        3.1 Separate Modulators
        3.2. Combined Modulators
    4.0 Method of Producing Broadband Optical Chirp
    5.0 Detailed Embodiments

1.0 Functional Overview

As described above, IBT materials are capable of storing spatial-spectral gratings with spectral features having bandwidths in excess of 1 GHz. Such gratings can represent meaningful information, such as the results of high-bandwidth analog optical processing, as described in Merkel I. Available highly sensitive (wide-dynamic-range) detectors and digitizers have bandwidths of only about 1 to 100 MHz, bandwidths that are too small by factors of 10 to 1000 or more. As described in Merkel I, a frequency chirp sweeping over the IBT frequency band of interest, e.g., in excess of 1 GHz, can produce a low-bandwidth readout signal that can be detected and digitized with the low-bandwidth high-dynamic-range devices currently available. However, current known techniques for producing chirps that are highly linear in frequency and highly stable are limited to narrowband pulses with bandwidths less than about 400 MHz. As described in Merkel II, a low-bandwidth readout signal is generated by probing the spatial-spectral grating in an IBT material with multiple linear, stable, chirps. The readout signal is produced based on processing multiple outputs received from the IBT material after probing by the multiple chirps.

According to embodiments of the present invention, a broadband frequency chirp probe signal for low-bandwidth readout is produced by frequency shifting optical signals with a frequency shift and modulating them by RF signals with a pulse bandwidth.

For purposes of illustration, the following description uses an example spatial-spectral grating with spectral features that include two periodic components in frequency representing the interaction of a transmitted signal with a reflected signal having two delayed near-replicas of the transmitted signal, as may occur in applications, such as RADAR, described in Merkel L However, embodiments of the invention are not limited to this example. Embodiments of the invention may be practiced in any application where the bandwidth desired for a waveform exceeds the bandwidth of available waveforms.

2.0 Example Application: Broadband Chirp Readout

FIG. 1A is a graph that illustrates a homogeneously broadened absorption spectral line 110 and an inhomogeneously broadened absorption spectrum 114 in an IBT material. The frequency axis 102 represents frequencies (f), in Hz, increasing to the right. The absorption axis 104 represents the population (N(f)) of absorbers, which are available to absorb light, and is related to the absorption of light per unit length along a spatial path into the material. The graph depicts a homogeneously broadened absorption spectral line 110 centered on line center frequency 103, which has a homogeneous line bandwidth proportional to the reciprocal of a time called the homogeneous dephasing time. The dephasing time is the time scale for coherent, phase-sensitive transitions between the ground state and the excited state for a homogeneous set of absorbing electrons.

The inhomogeneous broadening is typically caused by defects found in the host of the absorbing molecule or ion. These local defects, the "inhomogeneities," cause similar ions to have different resonant frequencies, but do not broaden the individual homogeneous resonances. The inhomogeneously broadened absorption spectrum 114 has a band center frequency 105 and an inhomogeneous spectrum bandwidth 116, also represented by the symbol $B_M$ for the material bandwidth. The band center frequency 105 is in the optical band, which encompasses frequencies from 100 to 1000 TeraHz (THz, 1 THz=$10^{12}$ Hz). However, the inhomogeneous spectrum bandwidth 116, $B_M$, is typically less than a few THz—large compared to the bandwidths available for processing using other techniques, but small compared to the hundreds of THz bandwidth of the optical band.

When an electron makes the transition to the excited state because of light impinging at a particular location in the material, there is one fewer absorber at that location. Therefore, the population of absorbers decreases and the absorption decreases at that location. Members of a population of excited electrons gradually return to the ground state, and the population of absorbers, along with the absorption, returns to its initial value. The time scale associated with this process is the population decay time, which is typically much longer than the dephasing time.

For purposes of illustration, it is assumed that the bandwidth of interest of the spatial-spectral grating in the IBT material is 4 GHz around a center optical frequency f0 (i.e., the band of interest spans f0−2 GHz to f0+2 GHz). It is further assumed that there are two periodic compon It is assumed for purposes of illustration that a useful duration is about a millisecond (Ms, 1 ms=$10^{-3}$ seconds), on the order of the population decay time for some IBT materials and the pulse rate for some RADAR applications; therefore $T_C$=1000 μs. In the illustrated example, the bandwidth of interest is 4 GHz (4000 MHz); therefore $B_C$=4000 MHz. Consequently, a useful chirp rate, in the illustrated embodiment, is about γ=4 MHz/μs.

Figure 1C:
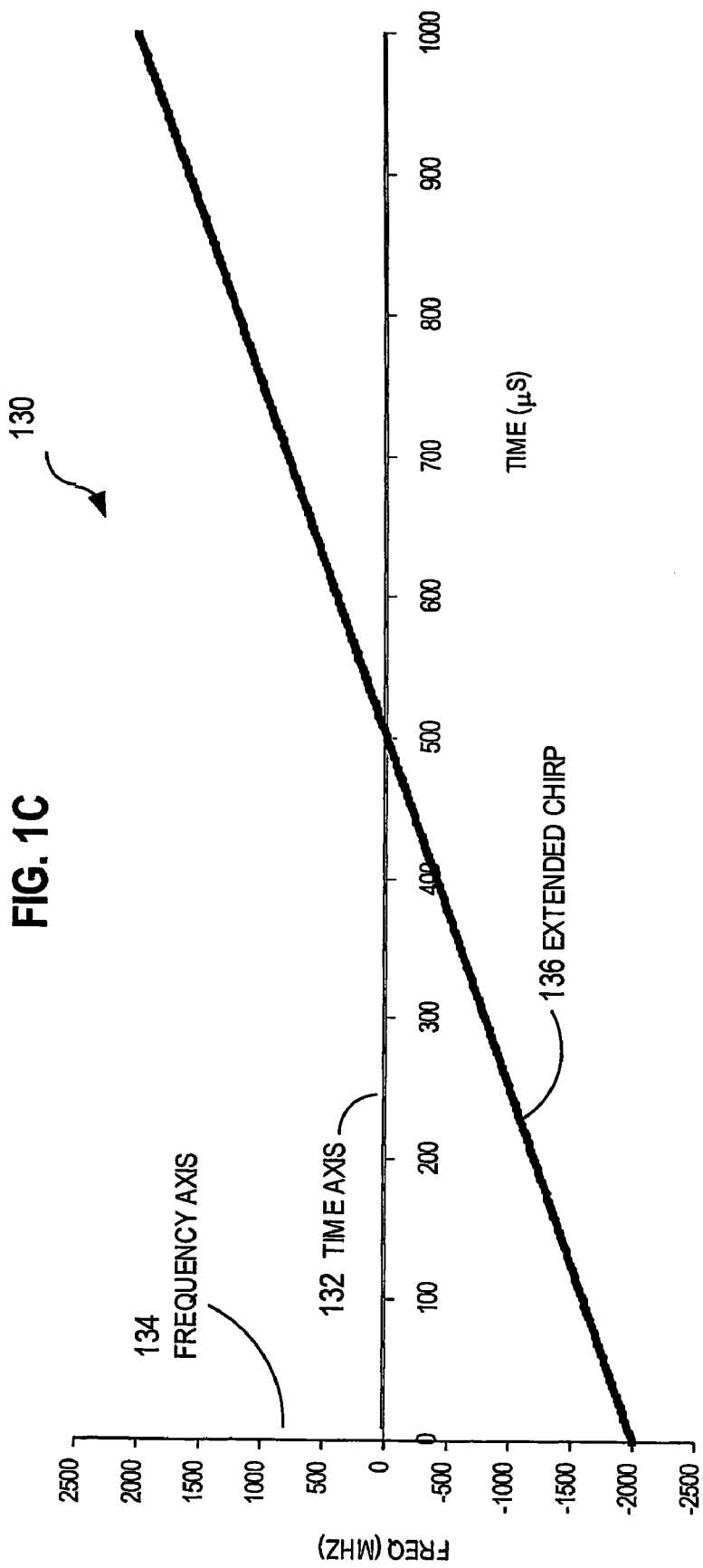
FIG. 1C is a graph that illustrates an example probe waveform for a readout process, according to an embodiment.

FIG. 1C is a graph 130 that illustrates an example desired probe waveform for the readout process. The horizontal time axis 132 represents time during the probe waveform, increasing to the right from 0 to 1000 μs. The vertical frequency axis 134 represents frequency deviation from the central processing frequency f0, in MHz, increasing upwards. This probe waveform is composed of an extended chirp, as suggested in Merkel I. The example probe waveform is an extended chirp 136 that has duration of one millisecond, that has a chirp rate (γ=4 MHz/μs), and that, consequently, spans the entire 4000 MHz bandwidth of interest in the illustrated embodiment.

In general, the probe waveform produces multiple high-bandwidth output signals from the spatial-spectral grating in the IBT material, a transmission and zero or more echoes. The transmission includes high-bandwidth information from the absorption spectrum in the spatial-spectral grating. Each echo is a reduced amplitude replica of the probe waveform delayed by a time equal to the delay in the signals that interacted to form the spatial-spectral grating. If no delayed replica interacts to form the spatial-spectral grating, then no echo is typically produced.

To generate a low-bandwidth readout signal that can be detected with sensitive high-precision detectors and digitizers, the high-bandwidth output signals are combined to produce a low-bandwidth beat with a beat frequency $F_B$ that is proportional to the delay τ and the chirp rate γ, as shown in Equation 3a.

$$F_B = \gamma^* \tau \tag{3a}$$

As is well known in the art, beat frequencies are formed at both the sum and difference in frequency of two simultaneous signals at a detector. The difference frequency is of use in the illustrated application because the difference is a detectable frequency. With delayed chirped signals, as used here, the frequency difference is steady and equal to the chirp rate κ times the delay τ. Each beat frequency commences after the start of the output signal by the delay time corresponding to the beat. In terms of the period P (in units of frequency) of the oscillations in the absorption spectrum, this relationship is expressed in Equation 3b.

$$F_B = \gamma/P \tag{3b}$$

If the spatial-spectral grating contains delays, the low-bandwidth readout signal includes a linear superposition of the beat frequencies associated with all the delays. Table 1 gives values for the delays τ, periods P, and beat frequencies $F_B$ for the illustrated example of a spatial-spectral grating, and for several values of the chirp rate γ. As can be seen in Table 1, the beat frequencies, $F_B$, are low bandwidth signals that are easily measured by high-dynamic-range detectors and digitizers operating in the megaHertz range. A readout signal with such beat frequency components provide a low-bandwidth temporal map of the spectral features of interest in the interaction absorption spectrum. Any beat frequencies that can be measured well can be used, such as the beat frequency in the third line of Table 1.

TABLE 1

Values of spectral features for example spatial-spectral grating.

| τ (μs) | P (MHz) | $F_B$ (MHZ) for γ = 2 MHz/μs | $F_B$ (MHZ) for γ = 4 MHz/μs | $F_B$ (MHZ) for γ = 8 MHz/μs |
|---|---|---|---|---|
| 0.003 | 333.3 | 0.006 | 0.012 | 0.024 |
| 0.005 | 200 | 0.010 | 0.020 | 0.040 |
| 5 | 0.2 | 10 | 20 | 40 |

FIG. 1D is a graph 140 that illustrates an example time trace 146 of a readout signal based on the spectral content of FIG. 1B and the probe waveform of FIG. 1C. The horizontal time axis 142 represents time after a signal is received at the detector, increasing to the right from 0 to 1000 μs. The vertical amplitude axis 144 represents amplitude of the readout signal in arbitrary units. The illustrated readout signal represented by trace 146 includes two low-bandwidth beats, one at 0.012 MHz and another at 0.020 MHz corresponding to the two delays τ1, τ2 and a chirp rate of 4 MHz/μs. These appear as temporal oscillations with temporal periods of about 83 μs and 50 μs, respectively. The two temporal oscillations are delayed by 0.003 μs and 0.005 μs, respectively; such delays are too small to see in FIG. 1D, or to measure with MHz range detectors and digitizers. Thus the delays 0.003 μs and 0.005 μs are determined based on the chirp rate γ, the easily measured beat frequencies $F_B$ at 0.012 MHz and 0.020 MHz in the low-bandwidth temporal oscillations, and Equation 3a In other embodiments, with longer delays τ, the periods of the beats are much smaller, and hundreds or thousands of oscillations are observed in the 1000 μs of a readout signal.

Figure 1E:
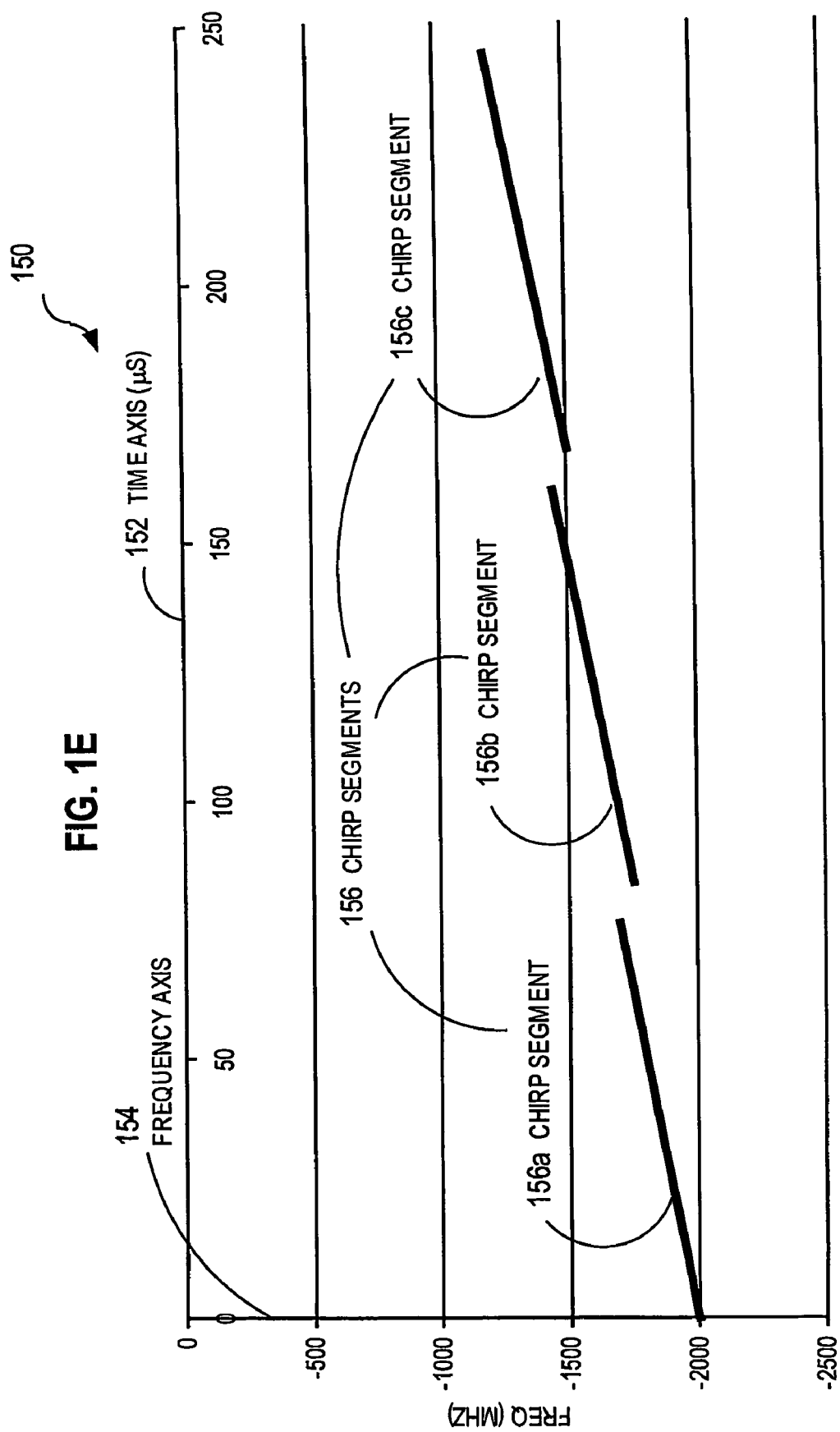
FIG. 1E is a graph that illustrates an alternative probe waveform with multiple overlapping narrowband chirp segments, according to an embodiment

FIG. 1E is a graph that illustrates an alternative probe waveform with multiple overlapping narrowband chirp segments, according to Merkel II. The horizontal axis 152 is time from beginning of the probe signal in μs. The vertical axis 154 is frequency difference from a center frequency f0. Each narrowband chirp is considered a chirp segment (or probe waveform) of multiple chirp segments (probe waveforms) that make up the probe signal. To avoid cluttering the diagram, the entire example probe signal is not displayed; only the first three chirp segments 156a, 156b, 156c are displayed of sixteen chirp segments 156 that span the frequency range of interest from f0−2000 MHz to f0+2000 MHz. In the illustrated embodiment, each chirp segment 156 is about 300 MHz wide and overlaps by about 50 MHz one or two adjacent chirp segments. For example, chirp segment 156a extends from f0−2000 MHz to about f−1700 MHz and overlaps by about 50 MHz the chirp segment 156b that extends from about f0−1750 MHz to about f0−1450 MHz. Chirp segment 156b not only overlaps chirp segment 156a by about 50 MHz, but also overlaps by about 50 MHz chirp segment 156c that extends from about f0−1500 MHz to about f0−1200 MHz.

In other embodiments, chirp segments are used that do not overlap in frequency. For example, in some embodiments, chirp segments are separated from other chirp segments by a frequency gap. In these embodiments, the waveform is said to be quasi-continuous in frequency. In some embodiments, there is essentially neither an overlap nor a gap, but instead the highest frequency in one chirp segment is essentially equal to the lowest frequency of the next chirp segment. In embodiments without gaps, the waveform is said to be continuous in frequency.

In the illustrated embodiment, each chirp segment 156 is separated in time from an adjacent chirp segment 156 by about 8 μs. In other embodiments, the chirp segments are not separated in time or are separated by more or less than 8 μs or overlap in time. In the preferred embodiments, no chirp segments 156 overlap in time, so that outputs from different chirp segments remain distinct in time. In the illustrated embodiments, the about 50 MHz overlap in frequency and about 8 μs gap between chirp segments stretches out the duration of the probe signal. The about 50 MHz overlap band at 4 MHz/μs leads to about 12.5 μs extra time per chirp segment. This plus the about 8 μs gap leads to about 20.5 μs extra time per segment for a total additional duration of about 307.5 μs. Thus, the probe signal has a total duration of about 1307.5 μs, compared to the 1000 μs duration probe signal depicted in FIG. 1C.

2.2 Readout Structural Overview

Figure 2:
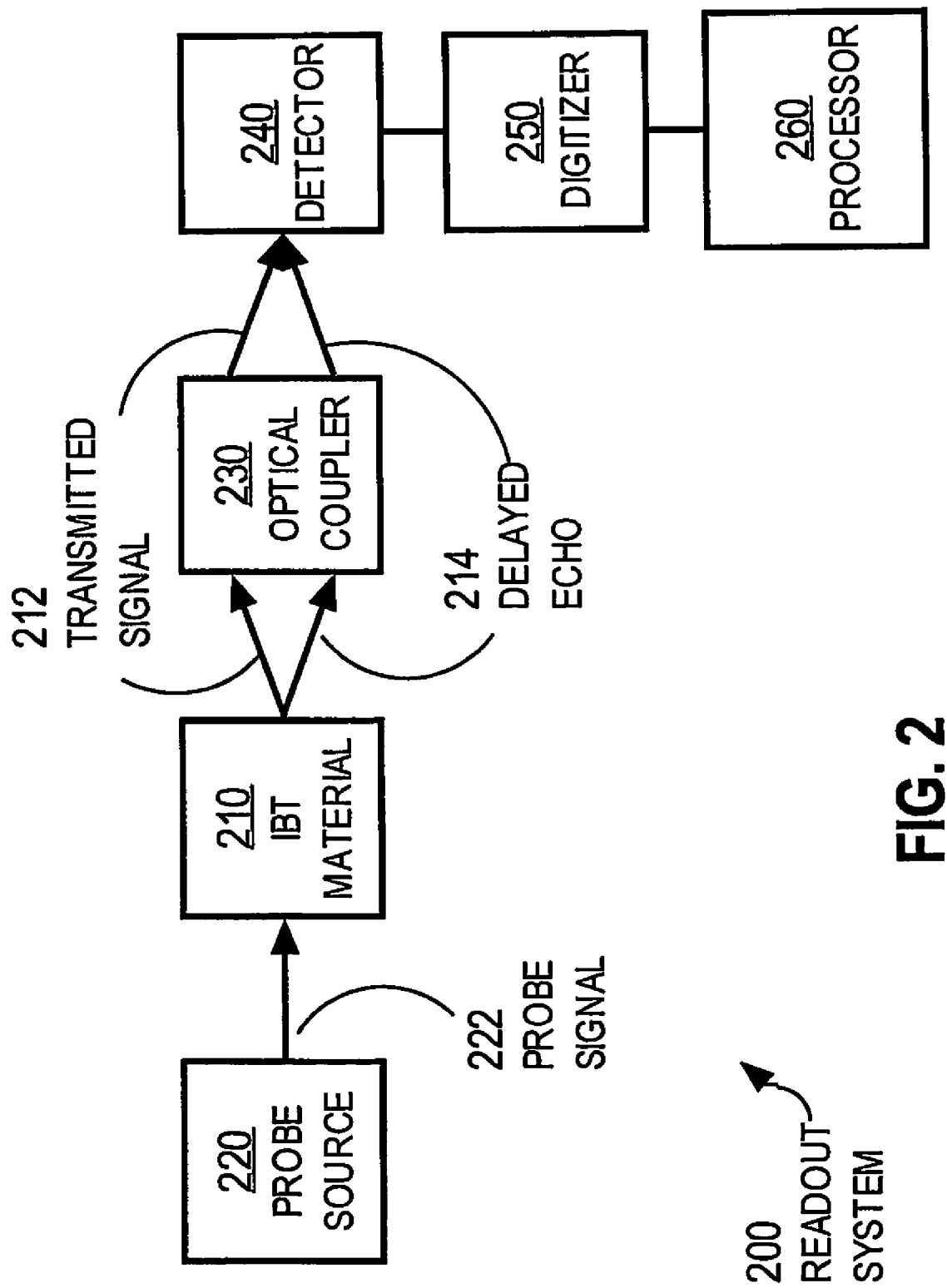
FIG. 2 is a block diagram that illustrates a system for performing the readout process, according to various embodiments.

FIG. 2 is a block diagram that illustrates a system 200 for the readout process, according to some embodiments. The system 200 includes the IBT material 210 with the spatial-spectral grating, a probe source 220, an output optical coupler 230, a low-bandwidth detector 240, a low-bandwidth digitizer 250, and a processor 260.

The IBT material 210 is programmed to contain a spatial-spectral grating with spectral features to be determined by the readout process. In some embodiments, the spatial-spectral grating is formed by the interaction of multiple waveforms incident on the IBT material along different spatial modes. As used herein, a spatial mode of an optical beam in the IBT material is a position and direction of propagation of the optical beam in the IBT material. A spatial mode in the IBT material is designated by its vector wavenumber, represented by the symbol k. In some embodiments, the spatial-spectral grating is formed by the interaction of multiple programming waveforms along the same spatial mode. In still other embodiments, the spatial-spectral grating is formed by a single programming waveform. In the current illustrated example, the spatial-spectral grating includes the optical interaction spectrum 126 depicted in FIG. 1B formed by two programming signals arriving on different spatial modes k1 and k2.

The probe source 220 generates an optical probe signal 222 to determine the spectral content of the spatial-spectral grating in the IBT material 210. In the current illustrated example, the probe signal 222 is the extended chirp 136 depicted in FIG. 1C or overlapping narrowband chirps depicted in FIG. 1E. The optical probe signal 222 is in a beam that is directed by an optical coupler (not shown) into the IBT material along a probe spatial mode designated by its vector wavenumber $k_p$. An optical coupler is any combination of components known in the art that are used to direct an optical beam, such as free space, vacuum, lenses, mirrors, beam splitters, wave plates and optical fibers.

The output optical coupler 230 directs the transmission output signal 212 and the delayed echo 214 for further processing. Any method known in the art at the time the system 200 is assembled may be used to couple the output signals so that they are combined to form a low-bandwidth beat signal at the detector. In the illustrated embodiment, among others, the transmission and one or more echoes are directed by optical coupler 230 so that they are combined at the detector 240 to form a detectable signal with one or more low-bandwidth beat frequencies. In some embodiments, the delayed echo 214 is combined at the detector 240 with a replica of the probe signal 222 instead or, or in addition to, the transmitted signal 212.

In some embodiments, the transmission and echo are emitted from the IBT material 210 in different spatial modes, as displayed in FIG. 2. This occurs, for example, when the programming optical signals had interacted in the IBT material 210 along different spatial modes, e.g., when k1 is different from k2. In embodiments with more than two programming signals that interact among more than two different spatial modes, echoes in more than one spatial mode may appear.

In some embodiments, the transmission and echo are emitted from the IBT material 210 in the same spatial mode. This occurs, for example, when the programming optical signals interacted in the IBT material 210 along the same spatial mode, e.g., k1=k2. In such cases the transmission and delayed echo are inherently combined into a low-bandwidth beat signal. In some embodiments, such as when a hole is burned in the IBT material, there may be only optical coherent transient effects that indicate the presence of the hole. In embodiments with no echo or with echo and transmission signal inherently combined, the optical coupler 230 simply directs a single optical beam output from the IBT material onto the detector 240; in some such embodiments the optical coupler 230 may simply be composed entirely of free space.

Detector 240 measures the intensity of an optical beam impinging on the detector. Any method known in the art and capable of measuring the spectral features of interest may be used as the detector 240. For example, some detectors generate a voltage proportional to the intensity of light impinging on the detector within the entire optical frequency band (several THz). In the illustrated embodiment, a high-dynamic range, low-bandwidth detector is used as detector 240 to produce a low-bandwidth temporal trace of voltage, such as trace 146, that is proportional to intensity of the optical low-bandwidth beat signal.

Digitizer 250 transforms an analog signal from detector 240 into digits that can be processed by a digital processor. In some embodiments, detector 240 and digitizer 250 are combined in a digital sensor. In some embodiments, subsequent processing is done with an analog processor; and digitizer 250 may be omitted. In the illustrated embodiment, a high-dynamic-range low-bandwidth digitizer is used as digitizer 250.

Processor 260 uses the measured trace, proportional to intensity, to determine the spectral features of the spatial-spectral grating. In the illustrated embodiment, processor 260 determines the two beat frequencies $F_B$ (0.012 MHz and 0.020 MHz) from trace 146, such as by performing a Fourier transform of the trace, and derives the two delays (0.003 µs and 0.005 µs, respectively) based on those $F_B$ and the chirp rate of the probe signal, γ=4 MHz. In various embodiments, the processor 260 is a digital processor, an analog processor, or some combination of digital and analog processors. Digital components of a processor are often programmable by software. In embodiments with a programmable processor, the processor 260 includes software executed by the hardware.

3.0 Source for Broadband Optical Chirp

Stable, linear, phase continuous radio frequency (RF) chirps with the chirp rates on the order of MHz/µs can be created over narrow bandwidths well below 1 GHz (e.g., 250-400 MHz), for example, by direct digital synthesis of analog waveforms, using a high clock rate and high-dynamic-range digital to analog converters (e.g., 10 bit at 100 Ms/s, as is currently commercially available with AD9858, or greater, as anticipated for future products).

Such RF chirps can be used to drive a single sideband (SSB) optical modulator (e.g., acousto-optic modulator, driven with a 250-350 MHz RF signal and optically double passed), to create an appropriate narrowband optical chirp (e.g., a 200 MHz bandwidth optical LFM around an optical frequency f0) that can be used to read out a narrowband (e.g. 200 MHz) portion of the spectral grating. For example, an optically double passed acousto-optical modulator driven with a 250-350 MHz RF signal chirp can create frequency modulation of an optical carrier at frequency f0 over frequencies of 500 MHz to 700 MHz added to that carrier. Such RF chirps can also be used to drive a double or multiple sideband optical modulator (e.g., electro-optical modulator) as well.

According to one embodiment, a continuous, linear, stable optical LFM for the probe signal, such as extended chirp 136, is generated in probe source 220 from a narrowband chirp by passing the narrowband chirp repeatedly through an optical ring that creates a temporal comb of frequency-shifted replicas of the narrowband chirp on an optical carrier. An optical ring containing a frequency shifter, delay line and optical amplifier can be injected with a narrowband chirp and used to create a timed sequence of chirps (frequency-shifted each ring pass). These chirps can then make a patched sequence of narrowband chirps to cover a wide bandwidth spectral region. For example, a 200 MHz chirp with γ=4 MHz/µs is passed 20 times through this ring. The result is an optical 4000 MHz bandwidth chirp extending from f0−2000 MHz to f0+2000 MHz with the same value of γ. Some of these embodiments may use one modulator to form a single frequency pulse and a different modulator to form the original narrowband chirps. In some embodiments, however, the modulators may be combined to form both the pulse and the narrowband chirp. Therefore, probe sources using this approach are called combinable modulator sources, and are described in more detail in a later section.

In another embodiment, a continuous, linear, stable optical LFM, such as extended chirp 136, is generated in probe source 220 by passing a substantively single frequency (tone) pulse repeatedly through an optical ring that creates a temporal comb of frequency-shifted replicas of the pulse on an optical carrier. An optical ring containing a frequency shifter, delay line and optical amplifier can be injected with the tone pulse and used to create a timed sequence of frequency tones (frequency-shifted each ring pass). These tones can then each be input to a single-sideband modulator, such as an AOM, and modulated with a narrowband RF frequency chirp to make a patched sequence of narrowband chirps to cover a wide bandwidth spectral region. Such probe sources use separate modulators to form the tone pulse and the narrowband chirps, and are described in more detail in the next section.

3.1 Separate Modulators

FIG. 3A is a block diagram that illustrates a probe source apparatus 300 for producing an optical broadband continuous frequency sweep, according to an embodiment using separate modulators. Probe source 300 includes an optical master oscillator 310, pulse modulator 320, chirp modulator 340, and a lightwave discrete frequency translator (LDFT) ring 302 that includes a frequency shifter 330 and output optical coupler (OOC) 304.

The optical master oscillator 310, also called a lightwave master oscillator (LMO) or frequency-stabilized laser, creates a temporally continuous optical signal of a stable frequency, $f_M$, as indicated by continuous wave 312 in FIG. 3A. An optical signal is continuous if it persists for an arbitrarily long time compared to the inverse of the frequency $f_M$. LMOs are well known in the art (see for example, R. W. P. Drever, J. L. Hall, F. V, Kowalski, J. Hough, G. M. Ford, A. J. Munley and H. Ward, "Laser Phase and Frequency Stabilization using an Optical Resonator," *Applied Physics B*, Photo Physics and Laser Chemistry, vol. B31, p 97, 1983; and U.S. Pat. No. 6,516,014 by P. Sellin et al., issued Feb. 4, 2003; entire contents of each of which are hereby incorporated by reference as if fully set forth herein). The better the frequency stability of the oscillator 310, the more spectrally pure and linear is the overall frequency sweep generated by the probe source 300.

The pulse modulator 320 forms an optical pulse of temporal duration T based on an input continuous wave optical signal. Pulse modulators are well known in the art. For example, pulse modulator 320 may comprise a chopper, an acousto-optic frequency modulator (AOFM), a Pockels cell, or some other element, or some combination of these elements. In some embodiments there is a frequency shift $\Delta f_P$ associated with the mechanism used as pulse modulator 320. The output from the pulse modulator 320 is a frequency pulse 322 of duration T with a fairly constant center frequency (also called a "tone pulse") at frequency $f_{C0}$ given by Equation 4a.

$$f_{C0} = f_M + \delta f_P \quad (4a)$$

Frequency shifter 330 accepts an input optical signal and creates a frequency-shifted replica. The frequency shift is Δf. The LDFT ring 302 includes well-known components to achieve a temporal comb of increasingly frequency-shifted replicas of the original input optical signal at multiples of Δf that correspond to the number of times a replica has passed through the loop. (See for example, the references cited in the Background section). As noted above, while some of these references claim to generate optical frequency sweeps, in every case the optical "sweeps" generated in the references are not continuous in frequency, but are noticeably stepped, producing a series of discrete optical frequencies. Furthermore, none of these references use a single-sideband chirp. In none of these references is a single sideband chirp injected into a frequency-shifting ring. In none of these references is the output of a frequency-shifting ring modulated by a single sideband chirp. Instead, in some references, a double sideband signal (such as generated in an EOM) is injected into a ring so that the output is a comb of contemporaneous frequencies. (See, for example, K. Shimizu, T. Horiguchi, Y. Koyamada, "Broad-Band Absolute Frequency Synthesis of Pulsed Coherent Lightwaves by Use of a Phase-Modulation Amplified Optical Ring," IEEE Journal of Quantum Electronics, V33, No 8 Aug. 1997, pp. 1268-1277.)

The output from discrete frequency shifter 330 is a frequency-shifted pulse 332 at new center frequency $f_{C1}=f_{C0}+\Delta f$. At an output optical coupler 304 part of the power in the frequency-shifted pulse 332 is output to the chirp modulator 340, and a portion of the power is returned in LDFT ring 302 to frequency shifter 330. At frequency shifter 330, the returned pulse is frequency-shifted again to output a new frequency-shifted pulse that is shifted by another $\Delta f$. The frequency output by frequency shifter 330 depends on the number of times the pulse has circulated in through frequency shifter 330 in the LDFT ring 302 as designated by the symbol i and given by Equation 4b.

$$f_{Cn}=f_{C0}+\Delta f^*i=f_M+\delta f_P+\Delta f^*i \quad (4b)$$

The output from LDFT ring 302 is therefore a comb of frequency-shifted tone pulses 334 each of duration T and successively incremented frequency. In the illustrated embodiments, the frequency pulse 322 from the pulse generator passes to OOC 304 before passing as input to frequency shifter 330. In such embodiments, Equation 4b applies with i=0 for the first tone pulse in the comb of pulses output from LDFT ring 302. It is noted that, as depicted in FIG. 3A, the output from ring 302 is not a continuous frequency sweep.

Any optical elements known in the art may be used to form OOC 304 and LDFT ring 302. In some embodiments, one or more optical elements are included in LDFT ring to correct for changes in amplitude, polarization, phase or direction of propagation generated during each pass through the ring. For example, an optical amplifier is needed so that successive pulses output from LDFT ring 302 do not decrease in amplitude due to power lost in pulses passed through OOC 304 and power lost due to optical attenuation within the ring. More details on the elements in an LDFT ring in some embodiments are described in a later section.

Chirp modulator 340 is formed from any optical elements well known in the art to form a narrowband chirp based on a tone pulse input. In some embodiments, chirp modulator 340 is an acousto-optic frequency modulator (AOFM) with a limited bandwidth driven by a narrowband radio frequency (RF) chirp driver. AOFMs usually deflect an incident optical beam at an angle that depends on frequency. To remove such spatial angular dependence, the optical beam is passed back through the AOFM in the opposite direction (double passed) in some embodiments. In some embodiments the RF driver for the AOFM is a chirped RF waveform generated directly by digital synthesis or by any other means known in the art. The output of the chirp modulator 340 is a quasi-continuous frequency broadband chirp, indicated by quasi-continuous broadband chirp 342 in FIG. 3A.

To ensure a continuous frequency optical chirp output from the chirp modulator, i.e., no substantive gaps in frequency, the RF driver is chosen to generate a narrowband chirp on the optical tone pulse that has a narrowband bandwidth (represented by the symbol BN) greater than or equal to the frequency shift applied by frequency shifter 330 on each pass through the LDFT ring 302, as expressed in Equation 5a.

$$B_N \geq \Delta f \quad (5a)$$

If the frequency chirp imposed on each tone pulse in the comb 334 has a bandwidth equal to the frequency shift $\Delta f$, then a linear chirp as depicted in FIG. 1C is produced. If the frequency chirp has a greater bandwidth, then an overlapping frequency probe signal is generated, such as the overlapping frequency probe signal depicted in FIG. 1E.

To prevent temporal overlap between narrowband chirps, the ring cycle time (designated by the symbol $T_R$) in LDFT ring 302 is designed to exceed the temporal duration $T_N$ of the narrowband chirp which is given by the quotient of the bandwidth $B_N$ divided by the chirp rate $\gamma$, as given by Equation 5b.

$$T_R \geq T_N = B_N/\gamma \quad (5b)$$

If the ring cycle time $T_R$ is equal to this quotient, then no temporal gap is produced, as depicted in FIG. 1C. If the ring cycle Time $T_R$ exceeds this quotient, then a temporal gap is generated between chirps, such in the probe signal depicted in FIG. 1E.

Figure 4:
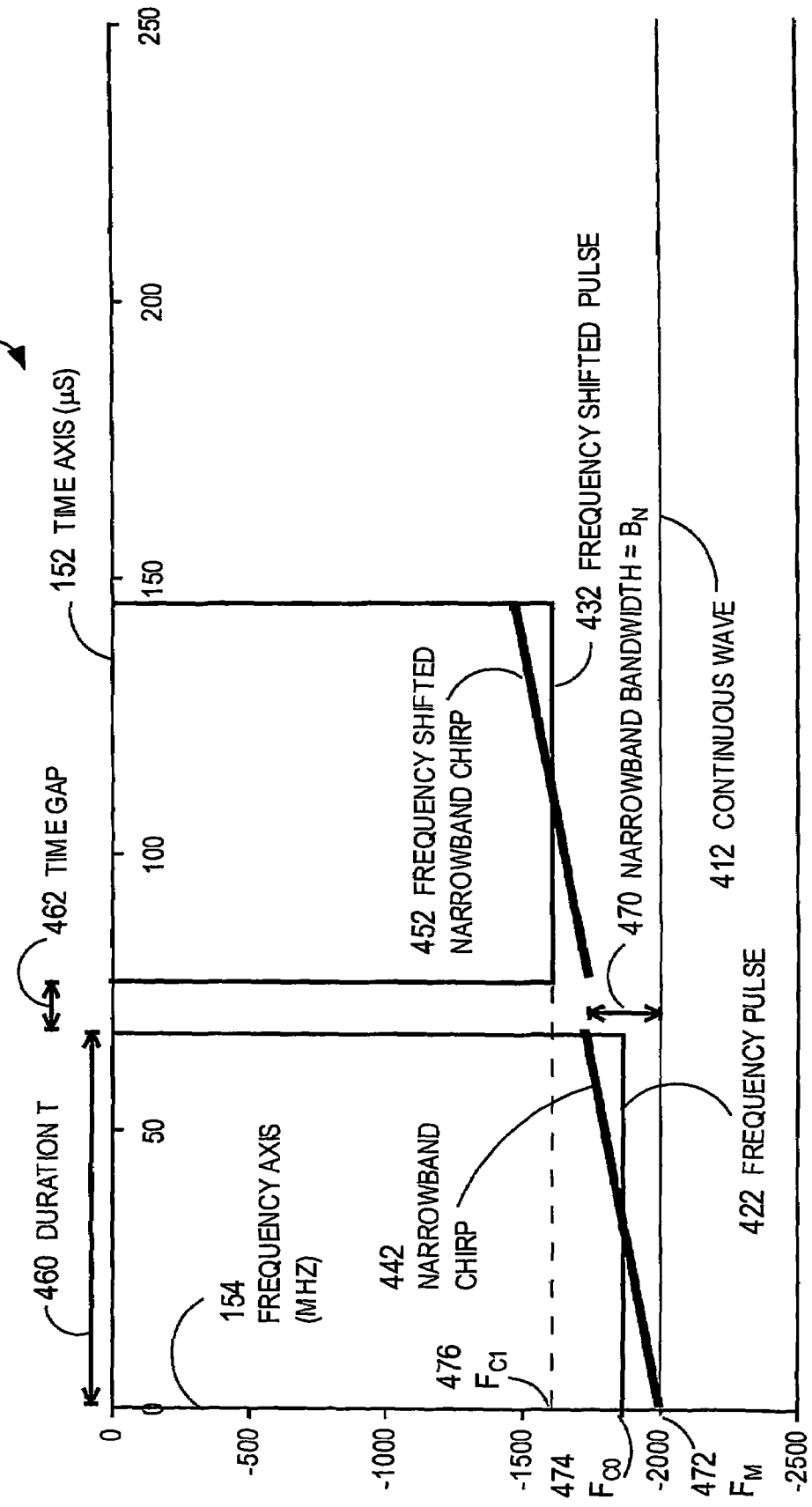
FIG. 4 is a graph that illustrates frequency-shifted narrowband chirps in a broadband quasi-continuous frequency chirp, according to various embodiments.

FIG. 4 is a graph 400 that illustrates frequency-shifted narrowband chirps in a broadband quasi-continuous frequency chirp relative to other optical beam components, according to various illustrated embodiments. The horizontal axis 152 is time from beginning of the probe signal in μs, as depicted in FIG. 1E. The vertical axis 154 is frequency difference from a center frequency f0, as depicted in FIG. 1E.

A temporal trace of frequency against time for the continuous wave 312 output by optical master oscillator 310 is given by Equation 6a.

$$f(t)=f_M \text{ for all } t \quad (6a)$$

For purposes of illustration, it is assumed that $f_M$ is f0−2000 MHz and that oscillator 310 can produce a stable frequency signal at $f_M$ for hundreds of microseconds. The resulting trace for the continuous wave 312 given by Equation 6a for the illustrated embodiment is plotted as continuous wave 412 in FIG. 4 at a frequency $f_M$ indicated by axis position 472.

A temporal trace of frequency against time for the frequency pulse 322 output by pulse modulator 320 is given by Equation 6b.

$$f(t)=f_{C1}=f_M+f_P \text{ for } 0<t\leq T_N \quad (6b)$$

For purposes of illustration, it is assumed that pulse modulator produces a pulse of duration $T_N$=62.5 μs (so that a chirp can be produced that spans 250 MHz with a chirp rate γ=4 MHz/μs). It is also assumed for purposes of illustration both that the pulse modulator 320 produces a frequency shift $f_P$ of 125 MHz, so that $f_{C0}$=−1875 MHz, and that the ring cycle time $T_R$ is 70 μs. The resulting trace for the frequency pulse 322 given by Equation 6b for the illustrated embodiment is plotted as frequency pulse 422 in FIG. 4 with a center frequency $f_{C0}$ indicated by axis position 474.

A temporal trace of frequency against time for the frequency-shifted pulse 332 output by frequency shifter 330 after i passes through the shifter 330 in the LDFT ring 302 is given by Equation 6c.

$$f(t)=f_{Ci}=f_M+f_P+i^*\Delta f \text{ for } i^*T_R<t\leq i^*T_R+T_N \text{ for } i=0,n \quad (6c)$$

For purposes of illustration, it is assumed that frequency shifter 330 produces a pulse with a frequency shift $\Delta f$=250 MHz. The resulting trace for the frequency-shifted pulse 332 given by Equation 6c for i=1 in the illustrated embodiment is plotted as frequency-shifted pulse 432 in FIG. 4 with a center frequency $f_{C1}$ indicated by axis position 476. The time gap 462 (represented by the symbol $T_G$) between the frequency pulse 422 and the frequency-shifted pulse 432 is given by the difference between the ring cycle time $T_R$ and the pulse duration $T_N$, as given by Equation 6d.

$$T_G = T_R - T_N \quad (6d)$$

A temporal trace of frequency against time for the comb 334 of frequency-shifted pulses output by LDFT ring 302 after 2 passes through the frequency shifter 330 is given by the sum of equations Equation 6c for i=0 and i=1, as shown by the two pulses 422 and 432 in FIG. 4. The second pulse is shifted relative to the first pulse by $\Delta f = 250$ MHz. These two pulses, as well as subsequent pulses for i>1 that are not shown in FIG. 4, are passed into the chirp modulator 340.

A temporal trace of frequency against time for the quasi-continuous broadband chirp 342 output by chirp modulator 340 after n passes through the shifter 330 in LDFT ring 302 is given by Equation 6e.

$$f(t) = f_M + f_P + i^*\Delta f - B_N/2 + (B_N/T)(t - i^*T_R) \text{ for } i^*T_R < t \leq i^*T_R + T \text{ and for } i = 0, n \quad (6e)$$

That is, a constant frequency in the ith pulse is replaced by a narrowband chirp spanning frequencies from $B_N/2$ below the center frequency $f_{Ci}$ of the ith pulse to $B_N/2$ above the center frequency $f_{Ci}$ (recall, $f_{Ci} = f_M + f_P + i^*\Delta f$ in Eq. 6c). From Equation 5a, there is the constraint that $B_N \geq \Delta f$, so that there is no gap in frequency coverage, i.e., the broadband chirp is continuous in frequency. In other embodiments, $\Delta f > B_N$ and the broadband chirp is "quasi-continuous." For purposes of illustration, it is assumed that $B_N = \Delta f = 250$ MHz so that there is also no overlap in frequency between pulses. The resulting trace for the continuous broadband chirp 342 given by Equation 6e for the illustrated embodiment for n=1 is plotted as narrowband chirp 442 (for i=0) and frequency-shifted narrowband chirp 452 (for i=1) in FIG. 4.

3.2. Combined Modulators

In the embodiment of FIG. 3A, the modulators 320 and 340 are separated by the LDFT ring 302. Pulse modulation is performed before the repeated discrete frequency shifts. Chirp modulation is performed after the repeated discrete frequency shifts. Therefore, the modulators 320, 340 are not easily combined into a single device. In embodiments described in the present section, chirp modulation is performed before the repeated discrete frequency shifts. Therefore, the modulators 320, 340 can be combined easily in a single device. In some of these embodiments, therefore, the two modulators 320, 340 are combined in a single device.

FIG. 3B is a block diagram that illustrates a probe source apparatus 350 for producing optical broadband continuous frequency sweep, according to an embodiment using easily combinable modulators. Probe source 350 includes an optical master oscillator 310, pulse modulator 320, chirp modulator 340, and a lightwave discrete frequency translator (LDFT) ring 302 that includes a frequency shifter 330 and output optical coupler 304, as described above. However, in this embodiment, the chirp modulator 340 is placed before the LDFT ring 302.

In some of these embodiments, the functions of pulse modulator 320 and chirp modulator 340 are combined to be performed by a singe device, optical modulator 360.

According to the embodiments illustrated in FIG. 3B, the frequency pulse 322 output from the pulse modulator 320 is input into the chirp modulator 340 instead of into the LDFT ring 302. The chirp modulator 340 produces a narrowband chirp 352. For example, pulse 422 in FIG. 4 is input into chirp modulator 340 to produce narrowband chirp 442. The narrowband chirp is then input into LDFT ring 302 where it is frequency-shifted zero or more times. After each frequency shift in frequency shifter 330, a frequency-shifted narrowband chirp 362 is produced. For example, chirp 442 in FIG. 4 is input into frequency shifter 330 to produce frequency-shifted narrowband chirp 452. In this embodiment, frequency-shifted tone pulse 432 is never produced.

The LDFT ring 302 outputs a temporal comb of successively frequency-shifted narrowband chirps that constitute the continuous broadband chirp 364. For example, the output of LDFT ring 302 is a broadband continuous frequency chirp with temporal gaps made up of successive narrowband chirps 442, 452 and subsequent narrowband chirps, not shown. A temporal trace of frequency against time for the continuous broadband chirp 364 output after n passes through the LDFT ring 302 is the same as the continuous broadband chirp 342, described above, and is given by Equation 6e.

In some embodiments, the temporal gaps are eliminated by selecting the ring cycle time $T_R$ to equal the chirp duration time $T_N$. In such embodiments, the broadband continuous frequency chirp is as depicted in FIG. 1C. In some of these embodiments, the LDFT ring 302 includes one or more optical components to match the phase of the highest frequency in chirp 442 with the phase of the lowest frequency in chirp 452.

In some embodiments, the frequency shift $\Delta f$ is chosen to be less than the narrowband chirp bandwidth $B_N$ so that there is an overlap in frequency, as shown in FIG. 1E. In FIG. 1E, $\Delta f$ is 250 MHz but $B_N$ is 300 MHz, so that there is a 50 MHz overlap between adjacent narrowband chirps. In some such embodiments, phase matching components in LDFT ring 302 may be omitted and the probe signal used as it is produced. The resulting output signals may be spliced together to form a readout signal, as described in Merkel II.

4.0 Method of Producing Broadband Optical Chirp

Figure 5:
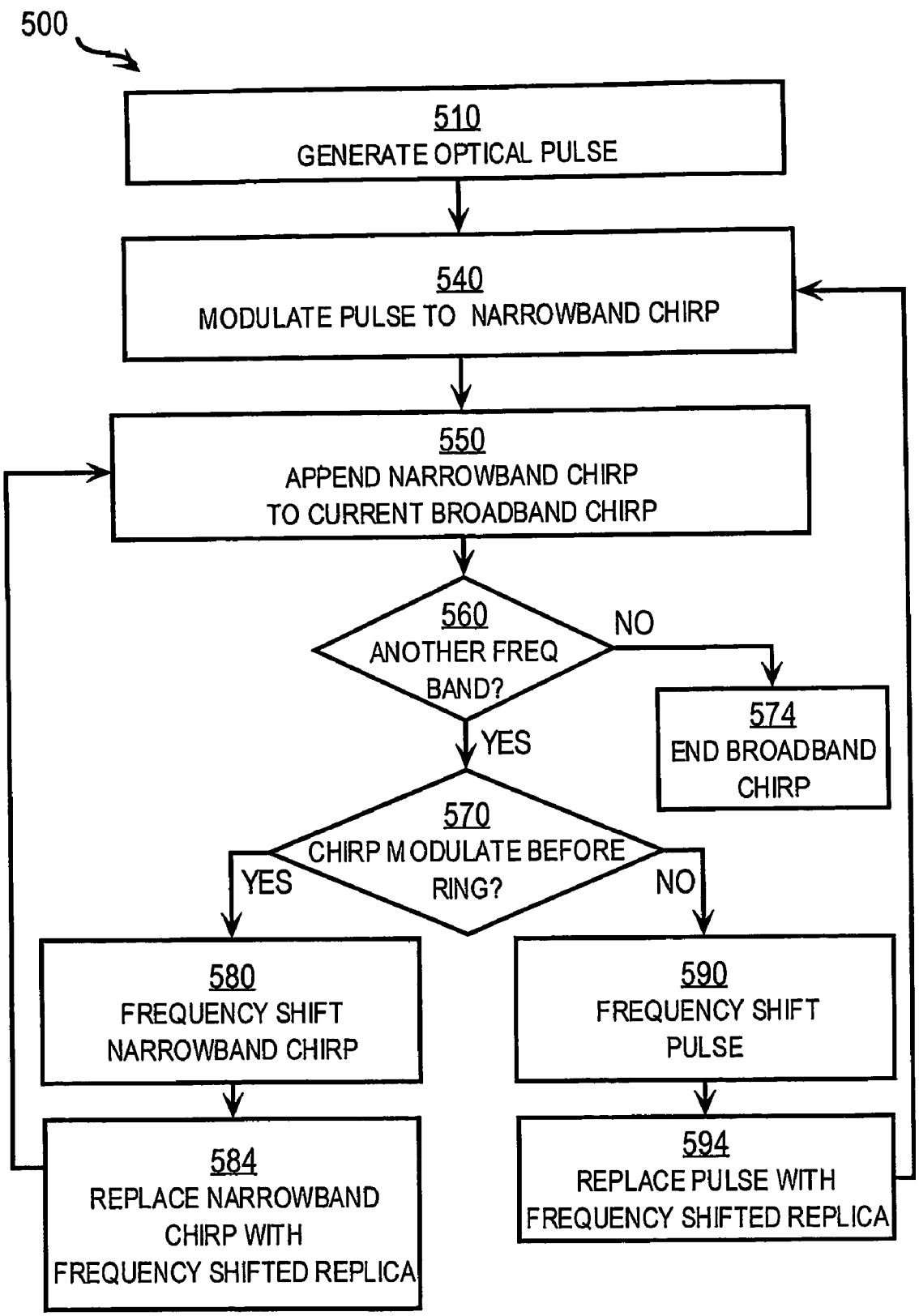
FIG. 5 is a flow chart that illustrates at a high level a method for producing a broadband quasi-continuous frequency chirp, according to various embodiments.

FIG. 5 is a flow chart that illustrates at a high level a method 500 for producing a broadband continuous frequency chirp, according to various embodiments. Although steps are shown in FIG. 5 in a particular order for purposes of illustration, in other embodiments the steps may be performed in a different order or overlapping in time.

In step 510, an optical pulse of duration T is generated. Any method known in the art for producing an optical pulse of limited duration may be used. For example, frequency tone pulse 422 with an optical center frequency is generated by modulating in pulse modulator 320 the continuous wave optical signal 412 from a frequency stabilized laser, master oscillator 310.

In step 540, the pulse is modulated to generate a narrowband chirp of duration $T_N$. Any method known in the art for modulating an optical frequency tone pulse to a narrowband chirp may be used. For example, frequency tone pulse 422 in FIG. 4 is modulated in chirp modulator 340 to form narrowband chirp 442. In some embodiments of probe source 300 using separate modulators, as depicted in 3A, the portion of the frequency pulse passed out of the OOC 304 of the LDFT ring 302 is modulated in pulse modulator 340 to form the narrowband chirp.

In step 550, the narrowband chirp is appended to the current broadband chirp. For example, narrowband chirp 442 is added to the output stream that is used as the quasi-continuous frequency broadband chirp. If there is not already a narrowband chirp in the output stream, step 550 includes using the narrowband chirp as a beginning temporal segment of the broadband chirp in the output stream. In embodiments of probe source 300 using separate modulators, as depicted in 3A, the portion of the narrowband chirp generated by chirp modulator 340 forms the narrowband chirp appended to the output stream that constitutes the frequency continuous broadband chirp. In embodiments of probe source 350 using combinable modulators, as depicted in 3B, the portion of the narrowband chirp passed out of the OOC 304 of the LDFT ring 302 forms the narrowband chirp appended to the output stream that constitutes the quasi-continuous frequency broadband chirp.

Step 560 represents a decision point in which it is determined whether another frequency band is to be added to the broadband chirp. If not, control passes to step 574 to end the broadband chirp. Otherwise control passes to step 570. Any method may be used to determine whether another frequency band is to be added to the output stream. In some embodiments, a counter is used to determine the number of passes of an optical signal through the LDFT ring. In some embodiments, a frequency detector is used to determine when a last frequency for the chirp has been achieved. In some embodiments, a timer is used to determine when a chirp of sufficient duration has been produced.

In step 574, the broadband chirp is ended. Any method known in the art when the device is constructed may be used. In some embodiments, the optical coupler 304 acts to prevent any further narrowband chirps from exiting the LDFT loop. In some embodiments an amplifier in the LDFT ring is turned off or operated to decrease the intensity of the circulating optical signal. In some embodiments, an RF source driving the frequency shifter 330 is turned off to cease output by the shifter 330.

Step 570 represent a decision point in which it is determined whether to use embodiments that perform chirp modulation before or after frequency shifting in an LDFT ring. Step 570 may be performed in any manner. In some embodiments, step 570 is performed by logic circuitry with or without software instructions. In the illustrated embodiment the choice represented by step 570 is made by employing a particular hardware configuration. For example, the choice to perform chirp modulation before the LDFT ring is made by constructing a device 350 as depicted in FIG. 3B, and the alternative choice is made by constructing a device 300 as depicted in FIG. 3A.

If chirp modulation is not performed before the LDFT ring (e.g., if the device 300 depicted in FIG. 3A is used) control passes to step 590. In step 590 the current frequency tone pulse is frequency-shifted to form a frequency-shifted replica of the tone pulse. The frequency shift may be positive or negative. The frequency-shifted signal is a replica in that it has the same frequency shape although at a different center frequency. For example frequency tone pulse 422 at −1875 MHz is frequency-shifted by +250 MHz in frequency shifter 330 to form frequency-shifted tone pulse 432 at −1625 MHz. In step 594, the frequency-shifted pulse becomes the current frequency tone pulse.

Control then passes to step 540 to modulate the new current frequency tone pulse into a narrowband chirp with a new center frequency. For example, current pulse 432 is passed out of LDFT ring 302 by OOC 304 and input into chirp modulator 340 to form a new narrowband chirp 452. In step 550, chirp 452 is appended to the continuous frequency broadband chirp 342 by being added to the output stream. Steps 590, 594, 540 and 550 are repeated until the output continuous broadband chirp achieves the duration and bandwidth desired for a particular application.

If chirp modulation is performed before the LDFT ring (e.g., if the device 350 depicted in FIG. 3B is used) control passes to step 580. In step 580 the current narrowband pulse is frequency-shifted to form a frequency-shifted replica of the narrowband chirp. The frequency shift may be positive or negative. The frequency-shifted signal is a replica in that it has the same frequency shape although at a different center frequency. For example frequency chirp 442 at center frequency −1875 MHz is frequency-shifted by +250 MHz in frequency shifter 330 to form frequency-shifted chirp 452 with center frequency −1625 MHz. In step 584, the frequency-shifted narrowband chirp becomes the current narrowband chirp.

Control then passes to step 550. In step 550, the current narrowband chirp is appended to the continuous frequency broadband chirp 342 by being added to the output stream. For example, current narrowband chirp 452 is passed out of LDFT ring 302 by OOC 304 to form the next temporal segment of continuous broadband chirp 364. Steps 580, 584 and 550 are repeated until the output continuous broadband chirp achieves the duration and bandwidth desired for the particular application.

5.0 Detailed Embodiments

FIG. 6A is a block diagram that illustrates a probe source 600 for producing a broadband continuous frequency chirp, according to a more detailed embodiment of probe source 350. In other embodiments of probe source 350 other elements may be used. In the illustrated embodiment, probe source 600 includes optical master oscillator 310 that produces continuous wave 312, as described above, as well as including combined modulator 660 and LDFT ring 650 to produce a continuous frequency broadband chirp 364, as described above. Probe source 600 is configured to produce a continuous broadband optical chirp with no frequency overlap and no time gap between narrowband chirps, as depicted in FIG. 1C. That is, for narrowband chirps of bandwidth $B_N$ and duration $T_N$, probe source 600 is configured with $\Delta f = B_N$ and $T_R = T_N$.

Combined modulator 660 includes acousto-optic frequency modulator (AOFM) 620 driven by RF chirp driver 640. The RF chirp driver is configured to have a bandwidth $B_N$ set by an RF offset source 644, which is also used for $\Delta f$ in the LDFT ring 650 described below. For example, RF offset source 644 provides a RF signal at 250 MHz, and RF chirp driver 640 produces an RF chirp that varies from an RF carrier (e.g. 800 MHz) plus 0 MHz to the RF carrier plus the offset frequency of 250 MHz. Amplitude modulation of the RF chirp driver is used to generate the pulse in the AOFM 620. For example, the amplitude is at an "on" level for the pulse duration $T_N$ and at an "off" level before and after.

The LDFT ring includes the RF offset source 644, an output optical coupler (OOC) 652, an acousto-optic frequency shifter (AOFS) 630, a fiber delay line 654, an optical amplifier 670, an isolator 656 and other optical components, including optical components 658a, 658b, 658c, 658d, collectively referenced hereinafter as optical components 658.

Optical output coupler (OOC) 652 admits into the LDFT ring a portion of the power of the narrowband chirp 352, and directs a portion of the power of the narrowband chirp 352 toward an output as a first temporal segment of the continuous broadband chirp 364. Any component known in the art may be used; for example, a power (non-polarizing) beam splitter may be used as OOC 652.

AOFS 630 shifts the frequency of the optical input signal by a fixed amount Δf at a deflected angle and is driven by a single stable RF wave provided by RF offset source 644. The use of a common RF offset source 644 for chirp driver 640 and AOFS 630 serves to synchronize the modulator 620 and the shifter 630 for phase control. The first time through the LDFT ring 650, the input signal is the initial narrowband chirp 352, and the output is a replica shifted in frequency by $\Delta f$. On subsequent transits around the ring, the input signal is a frequency-shifted replica and the output is a new replica shifted by an additional $\Delta f$. For example, AOFS shifts an input signal by 250 MHz based on a 250 MHz RF wave provided by RF offset source 644. In the illustrated embodiment, the frequency-shifted replica is the frequency-shifted narrowband chirp 352 that is emitted at an angle from AOFS; and a second sideband also emitted by AOFS 630 is blocked by optical component 658a The result is a single sideband (SSB) frequency shift of $\Delta f$. In the illustrated embodiment, $\Delta f = B_N = 250$ MHz.

The frequency-shifted replica is directed into a fiber delay line 654 by optical component 658b. Any optical elements known in the art may be used in optical component 658b, e.g., a mirror, a lens, a wave plate to change phase or polarization, or some combination of one or more of these. Fiber delay line 654 includes an input optical couple to efficiently direct an incoming optical signal into the fiber and an output optical couple to efficiently direct an emerging optical pulse onto the next optical component 658c. The length of the fiber delay line is chosen so that the cycle $T_R$ time in the LDFT is as desired. In the illustrated embodiment, the length of the fiber delay line is chosen so that $T_R$ is substantively equal to the pulse duration $T_N$.

The delayed, frequency-shifted replica is then directed into an optical amplifier by optical component 658c. Any optical elements known in the art may be used in optical component 658c, e.g., a mirror, a lens, a wave plate to change phase or polarization, or some combination of one or more of these.

The optical amplifier 670 provides sufficient gain to make up for the power directed into the output by OOC 652 and for power lost during passage through the components of the LDFT ring 650. In the illustrated embodiment, the optical amplifier 670 is of a type that does not contribute excessive amplified spontaneous emissions (ASE) into the LDFT ring. In some embodiments, an optical band pass filter is included to reduce the effects of any such ASE. In some embodiments, the optical band pass filter is made to be tunable to track the frequency shifts of the ring. In some embodiments, the amplifier 670 is a rare-earth doped fiber. In some embodiments, the amplifier 670 is an tunable injection-locking filter (TILF) amplifier.

The amplified, delayed, frequency-shifted replica is then directed into an optical isolator 656 by optical component 658d. Any optical elements known in the art may be used in optical component 658d, e.g., a mirror, a lens, a wave plate to change phase or polarization, or some combination of one or more of these.

The optical isolator 656 ensures unidirectional propagation of the optical signal in the LDFT ring. For example, optical isolator 656 eliminates back reflections of light from components in the ring, such as light transmitted to it from a power beam splitter used as OOC 652. Any elements known in the art that ensure unidirectional propagation may be used.

The unidirectional, amplified, delayed, frequency-shifted replica is then directed as the input signal onto the OOC 652. The OOC 652 directs a portion of the power of the input signal toward an output as a next temporal segment of the continuous broadband chirp 364. The OOC 652 directs the remaining portion of the power to re-circulate in the LDFT ring.

In the illustrated embodiment, the remaining power is directed into the AOFS 630 for a subsequent frequency shift by $\Delta f$. If during a subsequent pass through AOFS 630, the amplitude of the RF offset source is reduced substantively to zero, optical signals stop circulating in the LDFT ring, and the continuous broadband chirp 364 ends.

In some embodiments, the LDFT ring 650 includes additional optical elements 658. Some embodiments include polarization control elements to change or maintain a constant state of polarization of the optical signal circulating in the LDFT ring. Some embodiments include phase control elements to change or maintain a constant phase of the optical signal circulating in the LDFT ring.

In some embodiments, the RF offset 644 or RF chirp 640, or both, are controlled by one or more electronic processors that are either internal to or remote from the device 600, or both.

Figure 6B:
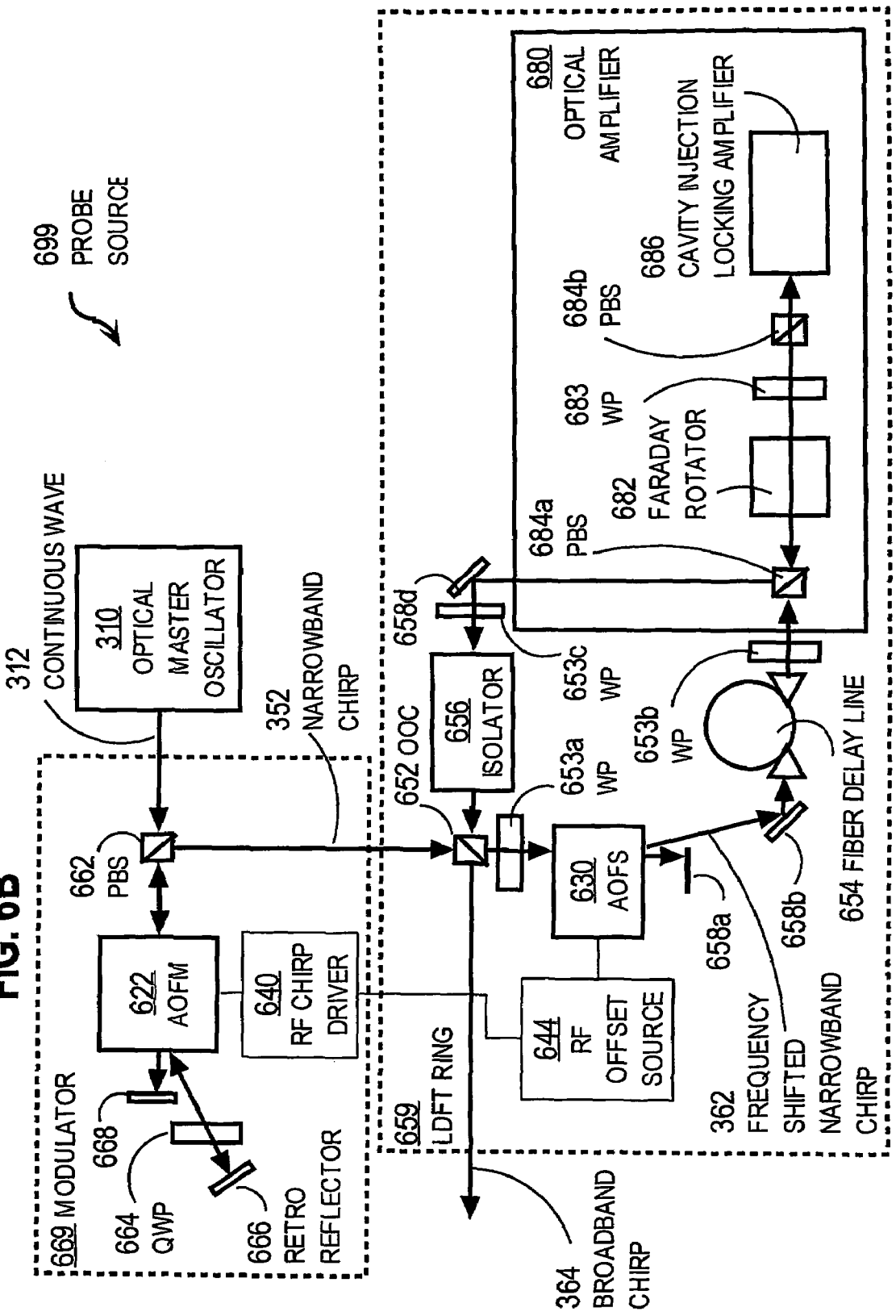
FIG. 6B is a block diagram that illustrates an apparatus for producing a broadband quasi-continuous frequency chirp, according to another more detailed embodiment.

FIG. 6B is a block diagram that illustrates a probe source 699 for producing a broadband chirp, according to another detailed embodiment of probe source 350. In the illustrated embodiment, probe source 699 includes optical master oscillator 310 that produces continuous wave 312, as described above, as well as including combined modulator 669 and LDFT ring 659 to produce a continuous frequency broadband chirp 364, as described above. Probe source 699 is configured to produce a continuous broadband optical chirp with no frequency overlap and no time gap between narrowband chirps, as depicted in FIG. 1C. That is, for narrowband chirps of bandwidth $B_N$ and duration $T_N$, probe source 699 is configured with $\Delta f = B_N$ and $T_R = T_N$.

Combined modulator 669 includes a double passed AOFM 622 driven by RF chirp driver 640, as described above, a polarizing beam splitter (PBS) 662, a quarter wave plate (QWP) 664, a retro reflector 666 and other optical elements 668. The double passed AOFM 622 is used to reduce or eliminate more than a single sideband, while emitting all frequencies into the same spatial mode. A continuous wave 312 with polarization P (e.g., horizontally polarized) is transmitted from optical master oscillator 310 through PBS 662 and through AOFM 622. A single sideband is emitted from the AOFM 622 at angles that pass through QWP 664, which rotates the polarization by 45 degrees. The single sideband signals are reflected at retro reflector 666. A second sideband modulated signal, also emitted by AOFM 622, is blocked by optical component 688. The reflected signal from retro reflector 666 is rotated an additional 45 degrees by QWP 664 to orthogonal polarization S and passes again through AOFM 622. The double passed signal impinges on PBS 662 with perpendicular polarization S (e.g., vertically polarized); therefore it is reflected at PBS 662 toward LDFT ring 659 as single sideband narrowband chirp 352.

The LDFT ring 659 includes the RF offset source 644, the OOC 652, the AOFS 630, the fiber delay line 654, the isolator 656 and other optical components, including optical components 658a, 658b, 658d described above. In some embodiments, the RF offset 644 or RF chirp 640, or both, are controlled by one or more electronic processors that are either internal to or remote from the device 600, or both. In addition, LDFT ring includes a particular optical amplifier 680, described below, in place of a more generic optical amplifier 670 and includes wave plates (WP) 653a, 653b, 653c.

The WP 653a is a half-wave plate that rotates the orthogonal S polarized signal to P polarization. The optical signal is then frequency shifted by $\Delta f$ at the AOFS 630 and coupled through optical components 658b into fiber delay line 654, as described above. In some embodiments, the fiber delay line 654 preserves the polarization of the optical signal that enters the delay line 654. Polarization maintaining fiber is used in some such embodiments, although it is expensive for the long lengths employed in this device.

The TILF optical amplifier 680 includes two polarizing beam splitter (PBS) cubes 684a, 684b, a Faraday rotator 682, a wave plate (WP) 683, and a cavity injection-locking amplifier 686. In some embodiments, cube 684b is just a polarizer. The P polarized optical signal is transmitted through the PBS cube 684a, through the Faraday Rotator 682, half wave plate 683 and PBS cube 684b into the cavity injection-locking amplifier 686.

The TILF amplifier 680 provides sufficient gain to offset power losses in the LDFT ring without producing substantial ASE. In the illustrated embodiment, the amplifier 686 is a semiconductor wave guide with an anti-reflection coated free running diode laser (FRDL), so that the injected power causes the free running diode laser to lock to the injected signal as is well known in the art. (See, e.g., K. S. Repasky, P. A. Roos, L. S. Meng, J. L Carlsten, "Amplified output of a frequency chirped diode source via injection locking," *Optical Engineering*, vol. 40, p. 2501, 2001; and R. R Reibel, Z. Barber, M. Tian, W. R. Babbitt, Z. Cole and K. D. Merkel, "Amplification of high bandwidth phase modulated signals at 793 nm," *JOSA B*, vol. 19, p. 2315, 2002; the entire contents of each of which are hereby incorporated by reference as if fully set forth herein.) The amplified signal from the cavity injection-locking amplifier 686 is in P polarization and is transmitted through the PBS cube 684b. The amplified signal then passes through WP and the Faraday rotator 682. When the polarization of the FRDL is matched to the optical axes of the WP 683, the light will be S polarized at the input PBS cube 684a and will reflect into the ring, toward optical components 658d and isolator 656. Another HWP 653c rotates the signal back to P polarization.

The optical isolator 656 allows the amplified signal to pass in one direction only, so that the optical signals are propagating in the ring unidirectionally. The OOC 652 is used to extract some of the signal power to an output port, and to pass some of the signal power back to the ring for further frequency shift. The OOC 652 is a non-polarizing beam splitter. The power transmitted to the output port becomes the next temporal segment of the continuous broadband chirp 364.

For purposes of further illustration, it is assumed that the master lightwave oscillator 310 in FIG. 6A generates a lightwave with a frequency $f_0$ of 377.85975 THz (near 793.389 nanometers in vacuum). Furthermore, it is assumed that the RF chirp bandwidth B is set to 100 MHz (0.0001 THz) and the desired chirp rate is 4 MHz/μs. By design, the RF chirp pulse duration T is 25 μs. First, the RF chirp offset 644 driving the acousto-optic frequency shifter 630 in the LDFT ring 650 must be 100 MHz. This can be achieved with a conventional acousto-optic frequency shifter and a 100 MHz RF source. The RF chirp low frequency driver 640 driving the AOFM 620 in FIG. 6A is assumed to be centered around 300 MHz (in the range from 250 to 350 MHz), and is assumed to be added to the master lightwave oscillator frequency on modulation. (In other embodiments, the RF chirp low frequency is subtracted.) Assuming an upshift of frequency of 250 MHz, then the carrier frequency at the start of the chirp is 377.86000 THz after modulation by the 250 MHz signal, and then varies according to the chirp.

The fiber delay line 654 in the ring is the proper length to achieve a 25 μs delay. Assuming a core index of refraction of 1.5, then the speed of light in the core is $\sim 2 \times 10^8$ m/s. In an architecture where the light propagates through the fiber once, then approximately 5 km of fiber is used in fiber delay line 654.

Amplification requirements are made considering the losses of the ring. The following values are assumed for purposes of illustration. Coupling into the fiber during each circulation accrues ~2 decibels (dB) of loss. Propagation of the light through the fiber causes more loss. For example, the loss of fiber at 793 nm is about 4 dB/km, so that about 20 dB of loss accrues during the propagation of light through the fiber delay line 654. It is further assumed that another 3 dB of loss occurs in the rest of the ring, (e.g., the AOS device 630 before the fiber delay line 654 has 1 dB of loss, the isolator 656 has 1 dB of loss, and 1 dB loss at the output coupler 652). Under these assumptions, a total of 25 dB of gain by the optical amplifier 670 is desirable.

In the embodiment described here, the source 600 acts as a continuous-frequency lightwave synthesized frequency sweeper. The equation for the light frequency during the first seed pulse is $$f(t) = 377.86000 \text{ THz} + (0.000004 \text{ THz/μs}) * t \text{ for } 0 < t < 10 \text{ μs}$$

and is $$f(t) = 377.86000 \text{ THz} + (0.0001 \text{ THz}) * (N-1) + (0.000004 \text{ THz/μs}) * t \text{ for the Nth circulation}$$

Thus, the frequency after each circulation is given by Table 2 for the first three circulations. The pattern of Table 2 is continued for subsequent circulations.

TABLE 2

Values of time and frequency after each circulation.

| N | t (μs) | f (THz) |
|---|--------|---------|
| 1 | 10 | 377.8601000 |
| 2 | 20 | 377.8602000 |
| 3 | 30 | 377.8603000 |

At the output of the device 600, the low bandwidth frequency chirp is present throughout the lightwave. So, for example, if the time is t=1.234 μs is (or 123.4 μs), then the light frequency emitted by the source is f=377.860001234 THz (or f=377.8601234 THz). Or, for example, after 1 ms (or 10 ms), there would have been 40 (or 400) circulations of the pulse in the cavity, and the frequency of the output lightwave has swept to a value of 377.8641 THz (or 377.9000 THz), or a total of 4 GHz (or 40 GHz).

Figure 7B:
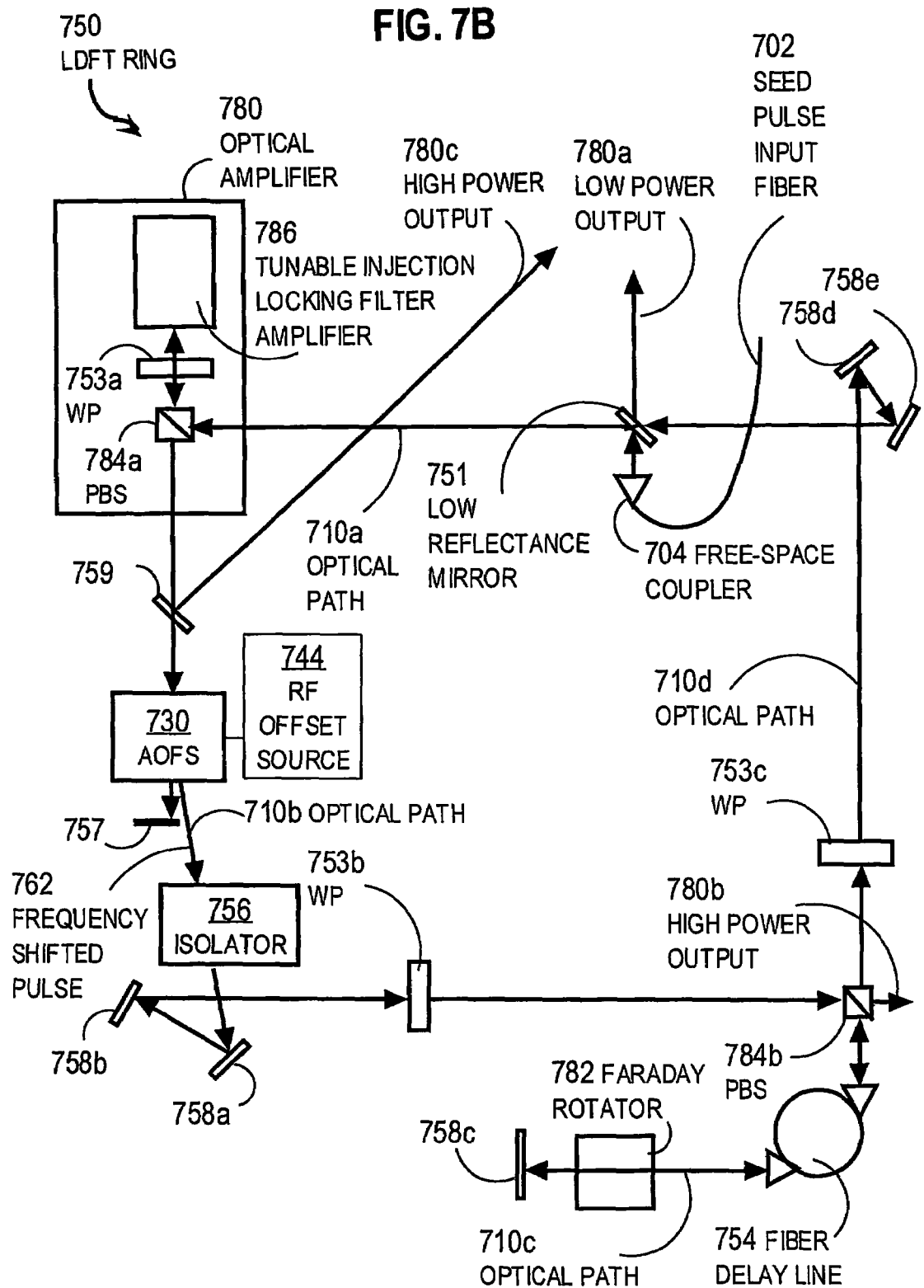
FIG. 7B is a block diagram that illustrates a ring for a probe source for producing a broadband chirp, according to this embodiment.

A demonstration was performed to illustrate an embodiment of the invention. In the demonstration, an apparatus as depicted in FIG. 7A and FIG. 7B was built. FIG. 7A is a block diagram that illustrates an apparatus 700 for demonstrating the operation of a source for a broadband chirp, according to an embodiment. FIG. 7B is a block diagram that illustrates a LDFT ring 750 for a probe source for producing a broadband chirp, according to this embodiment.

The apparatus 700 includes an optical master oscillator 720 and pulse modulator 722, an LDFT ring 750, an AOM 792, an IBT material 794, a detector 796 and an oscilloscope 798. As described above for oscillator 310 and modulator 320 in FIG. 3A, respectively, optical master oscillator 720 produces a continuous wave beam 721 and pulse modulator 722 produces a time limited pulse 723 at that frequency. The pulse 723 is input to LDFT ring where it is discretely frequency shifted to output a temporal comb of frequency-shifted pulses 791. The comb of pulses are modulated in AOM 792 and then directed onto the IBT material. In a programming step the modulated pulses are used to burn holes at arbitrary frequencies. In a readout step, the modulated pulses form a broadband chirp used to read the holes. The output from the readout step is directed onto detector 796 and displayed on oscilloscope 798.

Ring 750 includes an input optical coupler and an output optical coupler with associated components, optical amplifier 780, an AOFS 730 with associated components, an optical isolator 756, a fiber delay line 754 and a Faraday rotator 782. The ring 750 also includes additional various optical waveguide components such as mirrors 758a, 758b, 758c, and wave plate 753b.

The input optical coupler directs pulses received by the ring 750. In the demonstration embodiments, the input pulse (also called a "seed pulse") is a constant frequency pulse; but, in some embodiments, the seed pulse is a chirp. The input optical coupler includes a seed pulse optical fiber 702, a fiber-to-free-space coupler 704 and a low reflectance mirror 751. In the illustrated embodiment, the output optical coupler (OOC) is polarizing beam splitter (PBS) 784b. The associated components include mirrors 758d, 758e and wave plate 753c. The low reflectance mirror 751 is optically connected to the PBS 784b by optical path 710d.

The pulses output by ring 750 constitutes a high power output 780c from PBS 784b. In some embodiments, the output is a low power output 780a from low reflectance mirror 751. In some embodiments, an output optical coupler includes a partially silvered mirror 759 to direct a pulse out of the ring 750 as high power output 780c in addition to or instead of outputs 780a, 780b. In the embodiment used for the demonstration, mirror 759 and outputs 780a and 780c are omitted.

The optical amplifier 780 includes a PBS 784a, a half wave plate 753a and a tunable injection locking filter (TILF) amplifier 786. In some embodiments, PBS 784a is replaced by a polarizer. The optical amplifier 780 is optically connected to the input optical coupler by optical path 710a. The PBS 784a reflects vertically polarized (S state) photons and transmits horizontally polarized (P state) photons in an incident optical pulse. In the embodiment used for the demonstration, the wave plate 753a is a half wave plate that can change the polarization of the pulse to any angle, which can make some of the amplified light reflect back into the ring for alignment. In operation, the amplified light is made to transmit through 784a towards 730. Like the optical amplifier 680 in FIG. 6B, the optical amplifier 780 includes a Faraday rotator and second PBS (not shown).

The AOFS 730 is as described above with respect to AOFS 630. The associated components include the RF offset source 744 and optical blocking component 757. In some embodiments, the non-shifted light that impinges on optical blocking component 757 is used as a high power light output.

The isolator 756 is as described above with respect to isolator 656. In the embodiment used for the demonstration, the wave plate 753b is a half wave plate. The optical amplifier 780 is optically connected to the AOFS 730, isolator 756, and wave plate 753b by optical path 710b.

The Faraday rotator 782 is used in conjunction with mirror 758c to create a Faraday rotator mirror on optical path 710c. The light directed onto path 710c from PBS 784b is reflected at mirror 758c and made to traverse backwards through the fiber delay line 754 and emerge with a P polarization that allows it to pass through PBS 784b.

A seed pulse is input along fiber 702 into the ring 750 through the input coupler 751. The seed pulse may be a tone pulse as depicted in FIG. 3A or a narrowband chirp as depicted in FIG. 3B. In the demonstration embodiment, the seed pulse is a tone pulse and the optical master oscillator 720 is an external cavity laser diode (ECDL) locked to a spectral hole at 793.38 nanometers (nm, 1 nm=$10^{-9}$ meters). The pulse modulator 722 is an acousto-optic modulator that produces a pulse with a nominal pulse length of 20 μs. The pulse duration can be varied to be longer or shorter than this value with the acousto-optic modulator control electronics (not shown). The seed pulse was fiber coupled into fiber 702 and then directed into a free space optical path though fiber-to-free-space coupler 704. The free space optical path impinges on low reflectance mirror 751. Most of the pulse intensity is transmitted through the mirror 751 into output 780a. For example, in the demonstration embodiment, about 96% of the intensity is transmitted through mirror 751 onto output 780a and 4% is reflected onto optical path 710a to seed the amplifier. The output 780a is called "low power" output because the light on optical path 710d that has circulated through the ring with its losses and is then reflected by 751. In the demonstration embodiment, the circulated power at 751 was a few hundred microWatts (μW, 1 μW=$10^{-6}$ Watts).

The portion of the pulse photons directed along optical path 710a impinges on PBS 784a, where the S state photons are directed through half wave plate 753a into the TLIF amplifier 786.

In the demonstration embodiment, the amplifier 786 was made to operate so that about 50 milliWatts (mW, 1 mW=$10^{-3}$ Watts) of power is output on optical path 710b towards AOFS 730. In the half wave plate 753a, the polarization of photons output by the TILF amplifier 786 may be changed. The PBS 784a directs the P state photons onto optical path 710b.

In some embodiments a portion (e.g., 4%) of the amplified power on optical path 710b is output at low reflectance mirror 759 into the high power output 780c.

In the demonstration embodiment, mirror 759 and output 780c are omitted. The high power signal from optical amplifier 780 is directed onto AOFS 730 on optical path 710b. The pulse impinging on AOFS 730 is frequency shifted according to the RF electronic output produced by RF offset source 744. In the demonstration embodiment, the RF shift is about 80 MHz and the loss in the AOFS is approximately 1 dB.

The unmodulated light is blocked by optical component 757, but, in other embodiments is used as a high power (post amplifier) output signal. The frequency shifted pulse 762 travels along optical path 710b through isolator 756 and mirrors 758a, 758b onto half wave plate 753b. The half wave plate 753b is aligned at an angle that determines the ratio of S state to P state photons. The P state photons pass through PBS 784b to high power output 780b. For example, in the demonstration embodiment, the half wave plate 753b can be rotated so that 4% of the photons are observed in the P state and pass to the high power output 780b. The power on output 780b is high because there is relatively little loss in optical path 710b compared to the loss in the fiber delay line on optical path 710c, described next.

The S state photons are reflected by PBS 784b into fiber delay line 754, pass through Faraday rotator 782 and reflect back from mirror 758c. These reflected photons pass back on optical path 710c through the fiber delay line 754 for the second time. The photons are rotated by Faraday rotator 782 to be in the P state after passing out of the fiber delay line 754 back onto PBS 784b. In the demonstration embodiment, the delay line introduces a 21.8 μs round trip delay. Therefore the fiber delay line includes about two kilometers (km, 1 km=$10^3$ meters) of fiber. At over 4 dB loss per km and over a 4 km round trip, this results in about 18 dB total power loss in the delay line, including the Faraday Rotator mirror 782, 758c.

The P state photons from optical path 710c impinging on PBS 784b are transmitted through the PBS 784b onto optical path 710d. The photons are directed onto low reflectance mirror 751 where 4% of them are directed to low power output 780a. The losses in optical path 710d are small compared to the loss in optical path 710c. Because of the losses in the delay line 754, the output 780*a* is about 18 dB less than the high power output 780*b* when waveplate 753*b* is rotated so that 4% of the light exits on output 780*b*.

Either output 780*a*, 780*b* receives sequential pulses frequency shifted from adjacent pulses by the RF offset and delayed essentially by the delay line round trip. Thus in the demonstration embodiment, a sequence of 20 μs pulses sequentially offset by 80 MHz are received every 21.8 μs.

The components of ring 750 can be used for alignment in this configuration. For example, the optical output of the TILF 786 can be coupled backward into the ring by rotation of waveplate 753*a* to couple backwards into seed fiber 702. The length of optical path 710*a* can be adjusted. The TILF can be made to injection lock with a continuous wave tone from the seed fiber 702. The optical output of the TILF 786 can be coupled backward into the delay fiber 754 by adjusting the length of optical path 710*d* or the rotation of wave plate 753*c* or both. The optical output of the TILF 786 can be coupled forward into the delay fiber 754 through AOFS 730 by adjusting the settings of AOFS 730, path length 710*b*, and rotation angle of wave plate 753*b*.

With the demonstration embodiment, multiple frequency shifted pulses were obtained for a single tone seed pulse. These were then output and then modulated by an acousto-optic frequency modulator (AOFM) 792 and directed onto an IBT material 794. The RF source (not shown) to drive the AOFM 792 was made to produce a series of ring output pulses that were only frequency shifted by arbitrary amounts during the entire tone pulse. Then the arbitrarily shifted pulses were used to burn multiple arbitrary frequency holes across a broad frequency range in the IBT material 794. After this, the ring 750 was made to stop operating by turning off the RF source 744. The ring 750 was then started again with another seed pulse that occurred 1 ms later, which is within the persistence time of the spectra in the IBT material 794. Another series of frequency shifted output pulses from the ring 750 were then made, and these were then modulated by AOFM 792 to be chirped over 100 MHz by a RF signal to produce a broad bandwidth quasi-continuous chirp. When the broad bandwidth quasi-continuous chirp was directed onto the IBT material so as to be used to read out the IBT material frequency dependent absorption profile, the signatures of the arbitrary holes were detected in the readout signal. Thus a useful broadband quasi-continuous chirp was generated by multiple narrowband chirps produced in a ring, where broadband frequency coverage of the chirp was verified by storing spectral holes at unique frequencies over a broad bandwidth in the IBT material and then have these same arbitrary holes indicated by the readout signatures they caused when read out by the quasi-continuous broadband chirp.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of producing an optical broadband frequency sweep, comprising the steps of:
    generating a narrowband frequency chirp having a particular optical carrier frequency and a pulse duration and a pulse bandwidth;
    generating a frequency-shifted replica by frequency shifting the narrowband frequency chirp by a frequency shift; and
    generating a broadband frequency chirp by adding the frequency-shifted replica after a start of the narrowband frequency chirp by a delay.

2. A method as recited in claim 1, said step of generating a frequency-shifted replica further comprising frequency shifting the narrowband frequency chirp by a frequency shift that is no greater than the pulse bandwidth.

3. A method as recited in claim 1, said step of generating a narrowband frequency chirp further comprising generating a single-sideband narrowband frequency chirp.

4. A method as recited in claim 1, said step of generating the broadband frequency chirp further comprising adding the frequency-shifted replica after the start of the narrowband frequency chirp by a delay substantively equal to the pulse duration.

5. A method as recited in claim 4, said step of generating the broadband frequency chirp further comprising adding the frequency-shifted replica after the start of the narrowband frequency chirp with substantively no phase shift between the narrowband frequency chirp and the frequency-shifted replica.

6. A method as recited in claim 1, said step of generating the broadband frequency chirp further comprising adding the frequency-shifted replica after the start of the narrowband frequency chirp by a delay greater than the pulse duration.

7. A method as recited in claim 1, said step of generating the frequency-shifted replica further comprising frequency shifting the narrowband frequency chirp by the frequency shift that is substantively equal to the pulse bandwidth.

8. A method as recited in claim 1, said step of generating the frequency-shifted replica further comprising frequency shifting the narrowband frequency chirp by the frequency shift that is less than the pulse bandwidth.

9. A method as recited in claim 1, wherein:
    the method further comprises the step of repeating said step of generating the frequency-shifted replica by frequency shifting a previously frequency-shifted replica by the frequency shift; and
    said step of generating the broadband frequency chirp further comprises generating the broadband frequency chirp by adding the new frequency-shifted replica after a start of a previous broadband frequency chirp by a second delay.

10. A method of producing an optical broadband frequency sweep, comprising the steps of:
    generating a first optical chirp having a pulse bandwidth by modulating with a radio frequency chirp an optical frequency pulse having a particular frequency and a pulse duration;
    generating a frequency-shifted replica by frequency shifting the optical frequency pulse by a particular frequency shift;
    generating a second optical chirp having the pulse bandwidth by modulating the frequency-shifted replica with the radio frequency chirp; and
    generating a broadband frequency chirp by adding the second optical chirp after a start of the first optical chirp by a delay.

11. A method as recited in claim 10, said step of generating the first optical chirp further comprising generating a single-sideband optical chirp.

12. A method as recited in claim 11, wherein the first chirp has a duration substantively equal to a duration of the optical frequency pulse.

13. A method as recited in claim 10, said step of generating the second optical chirp further comprising generating a single-sideband optical chirp.

14. A method as recited in claim 13, wherein the second chirp has a duration substantively equal to a duration of the optical frequency pulse.

15. A method as recited in claim 10, said step of generating the broadband frequency chirp further comprising adding the second chirp after the start of the first chirp by a delay substantively equal to the pulse duration.

16. A method as recited in claim 15, said step of generating the broadband frequency chirp further comprising adding the second chirp after the first chirp with substantively no phase shift between the first chirp and the second chirp.

17. A method as recited in claim 10, said step of generating the broadband frequency chirp further comprising adding the second chirp after the start of the first chirp by a delay greater than the pulse duration.

18. A method as recited in claim 10, said step of generating the frequency-shifted replica further comprising frequency shifting the optical frequency pulse by the frequency shift that is substantively equal to the pulse bandwidth.

19. A method as recited in claim 10, said step of generating the frequency-shifted replica further comprising frequency shifting the narrowband frequency chirp by the frequency shift that is less than the pulse bandwidth.

20. A method as recited in claim 10, wherein:
the method further comprises generating the optical frequency pulse by frequency shifting a previous optical frequency pulse;
the method further comprises repeating said steps of generating the frequency-shifted replica, and
generating the second optical chirp by modulating the frequency-shifted replica with the radio frequency chirp; and
said step of generating the broadband frequency chirp further comprises generating the broadband frequency chirp by adding the second optical chirp to a start of a previous broadband frequency chirp by a second delay.

21. An apparatus for producing an optical broadband frequency sweep, comprising:
an optical source for generating a frequency-stabilized, optical frequency signal;
a radio frequency source for generating a radio frequency chirp;
a first optical modulator in optical communication with the optical source and electronic communication with the radio frequency source for forming an optical narrowband chirp having a particular narrowband bandwidth and a particular duration based on the optical frequency signal and the radio frequency chirp;
a frequency shifter in optical communication with the first optical modulator for forming a frequency-shifted replica by shifting an input optical signal by a frequency shift; and
an optical coupler for adding the frequency-shifted replica after a start of the input optical signal by a delay.

22. An apparatus as recited in claim 21, further comprising a second optical modulator in optical communication with the optical source for forming a pulse of the particular duration based on the optical frequency signal.

23. An apparatus as recited in claim 22, wherein:
the second optical modulator is different from the first optical modulator; and
the first optical modulator is in optical communication with the second optical modulator.

24. An apparatus as recited in claim 22, wherein the second optical modulator is the same as the first optical modulator.

25. An apparatus as recited in claim 22, wherein the first optical modulator is an acousto-optic modulator.

26. An apparatus as recited in claim 21, wherein:
the apparatus further comprises an optical ring that returns an optical signal incident at a position in the optical ring to that position at a later time; and
the frequency shifter and the optical coupler are disposed in the optical ring.

27. An apparatus as recited in claim 26, the optical ring further comprising:
a delay line for timing the frequency-shifted replica after the start of the input optical signal by the delay; and
an optical component for correcting a deviation in an optical property of the frequency-shifted replica caused by propagation of the replica through the optical ring.

28. An apparatus as recited in claim 27, wherein the optical property includes at least one of power, polarization, phase and direction of propagation.

29. An apparatus as recited in claim 21, wherein the input optical signal is the optical narrowband chirp from the first optical modulator.

30. An apparatus as recited in claim 21, wherein the input signal is a previous frequency-shifted replica.

31. An apparatus for producing an optical broadband frequency sweep, comprising:
an optical source for generating a frequency-stabilized, optical frequency signal;
a frequency shifter in optical communication with the optical source for forming a frequency-shifted replica by shifting an input signal by a particular frequency shift;
a radio frequency source for generating a radio frequency chirp;
a first optical modulator in optical communication with the frequency shifter and in electronic communication with the radio frequency source for forming an optical narrowband chirp with a pulse duration and a pulse bandwidth based on a reference optical signal and the radio frequency chirp; and
an optical coupler in optical communication with the first optical modulator for combining a first optical narrowband chirp based on the input signal as the reference optical signal and a second optical narrowband chirp based the frequency-shifted replica as the reference optical signal,
wherein the second optical narrowband chirp is added after a start of the first narrowband by a delay.

32. An apparatus as recited in claim 31, further comprising a second optical modulator in optical communication with the optical source for forming a pulse of the pulse duration based on the optical frequency signal.

33. An apparatus as recited in claim 32, wherein the first optical modulator is an acousto-optic modulator.

34. An apparatus as recited in claim 31, wherein:
the apparatus further comprises an optical ring that returns an optical signal incident at a position in the optical ring to that position at a later time; and
the frequency shifter and the optical coupler are disposed in the optical ring.

35. An apparatus as recited in claim 34, the optical ring further comprising:
a delay line for timing the frequency-shifted replica after a start of the reference optical signal; and
an optical component for correcting a deviation in an optical property of the frequency-shifted replica caused by propagation of the replica through the optical ring.

36. An apparatus as recited in claim 35, wherein the optical property includes at least one of power, polarization, phase and direction of propagation.

* * * * *